(12) United States Patent
Ben-Ami et al.

(10) Patent No.: US 12,525,058 B2
(45) Date of Patent: Jan. 13, 2026

(54) SYNCHRONIZING EYE MOVEMENT PARAMETERS FOR A DELAY FROM A MONITOR OUTPUT TO A SENSOR

(71) Applicant: NeuraLight Ltd., Ra'anana (IL)

(72) Inventors: Edmund Ben-Ami, Tel Aviv (IL); Micha Yochanan Breakstone, Austin, TX (US); Rotem Zvi Bar-Or, Jerusalem (IL); Vladimir Anisimov, Tel-Aviv (IL)

(73) Assignee: NeuraLight Ltd., Tel Aviv (IL)

( * ) Notice: Subject to any disclaimer, the term of this patent is extended or adjusted under 35 U.S.C. 154(b) by 844 days.

(21) Appl. No.: 17/734,896

(22) Filed: May 2, 2022

(65) Prior Publication Data
US 2022/0354363 A1 Nov. 10, 2022

Related U.S. Application Data

(60) Provisional application No. 63/183,388, filed on May 3, 2021.

(51) Int. Cl.
*G06F 3/01* (2006.01)
*A61B 3/00* (2006.01)
(Continued)

(52) U.S. Cl.
CPC ............ *G06V 40/18* (2022.01); *A61B 3/0025* (2013.01); *A61B 3/113* (2013.01); *A61B 5/163* (2017.08);
(Continued)

(58) Field of Classification Search
None
See application file for complete search history.

(56) References Cited

U.S. PATENT DOCUMENTS 6,820,979 B1 11/2004 Stark et al.
7,428,320 B2 9/2008 Northcott et al.
(Continued)

FOREIGN PATENT DOCUMENTS

CA 2618352 A1 2/2007
CN 106265006 A 1/2017
(Continued)

OTHER PUBLICATIONS

Qidwai, U., and Qidwai, U., "Blind Deconvolution for Retinal Image Enhancement," IEEE EMBS Conference on Biomedical Engineering and Sciences pp. 20-25, (2010).
(Continued)

*Primary Examiner* — Akwasi M Sarpong
*Assistant Examiner* — Pawan Dhingra
(74) *Attorney, Agent, or Firm* — Sterne, Kessler, Goldstein & Fox P.L.L.C.

(57) ABSTRACT

Disclosed are systems and methods for extracting high resolution oculometric parameters and eye movement parameters. A video stream having a video of a face of a user is processed to obtain a set of oculometric parameters, such as eyelid data, iris data (e.g., iris translation, iris radius and iris rotation), and pupil data (e.g., pupil center and pupil radius). The oculometric parameters are generated at a first temporal resolution. The oculometric parameters are up sampled to increase the temporal resolution to a second temporal resolution. The oculometric parameters are then processed to generate various eye movement parameters such as blink parameter, pupil response parameter, saccade parameter, anti-saccade parameter, fixation parameter, or smooth pursuit parameter. The oculometric parameters are synchronized with a video stimulus presented on a user device prior to generating the eye movement parameters.

33 Claims, 13 Drawing Sheets

(51) Int. Cl.
*A61B 3/113* (2006.01)
*A61B 5/16* (2006.01)
*G06T 7/00* (2017.01)
*G06V 40/18* (2022.01)

(52) U.S. Cl.
CPC ............ *G06F 3/013* (2013.01); *G06T 7/0012* (2013.01); *G06T 2207/20081* (2013.01); *G06T 2207/30041* (2013.01)

(56) References Cited

U.S. PATENT DOCUMENTS

| | | |
|---|---|---|
| 7,753,525 B2 | 7/2010 | Hara et al. |
| 7,869,627 B2 | 1/2011 | Northcott et al. |
| 8,061,840 B2 | 11/2011 | Mizuochi |
| 8,132,916 B2 | 3/2012 | Johansson |
| 9,965,860 B2 | 5/2018 | Nguyen et al. |
| 10,016,130 B2 | 7/2018 | Ganesan et al. |
| 10,039,445 B1 | 8/2018 | Torch |
| 10,109,056 B2 | 10/2018 | Nguyen et al. |
| 10,231,614 B2 | 3/2019 | Krueger |
| 10,575,728 B2 | 3/2020 | Zakariaie et al. |
| 10,620,700 B2 | 4/2020 | Publicover et al. |
| 10,713,813 B2 | 7/2020 | De Villers-Sidani et al. |
| 10,713,814 B2 | 7/2020 | De Villers-Sidani et al. |
| 11,074,714 B2 | 7/2021 | De Villers-Sidani et al. |
| 11,382,545 B2 | 7/2022 | Zakariaie et al. |
| 11,503,998 B1 | 11/2022 | De Villers-Sidani et al. |
| 11,513,593 B2 | 11/2022 | Drozdov et al. |
| 11,514,720 B2 | 11/2022 | Haimovitch-Yogev et al. |
| 11,556,741 B2 | 1/2023 | Dierkes et al. |
| 11,776,315 B2 | 10/2023 | Haimovitch-Yogev et al. |
| 12,033,432 B2 | 7/2024 | Ben-Ami et al. |
| 2005/0228236 A1 | 10/2005 | Diederich et al. |
| 2007/0009169 A1 | 1/2007 | Bhattacharjya |
| 2009/0018419 A1* | 1/2009 | Torch ............... A61B 3/112 348/78 |
| 2011/0077548 A1* | 3/2011 | Torch ............... A61B 5/165 600/558 |
| 2014/0152792 A1* | 6/2014 | Krueger ............ A61B 5/4863 348/78 |
| 2014/0171756 A1* | 6/2014 | Waldorf ............ A61B 3/032 600/301 |
| 2014/0313488 A1* | 10/2014 | Kiderman ......... A61B 3/005 351/246 |
| 2014/0320397 A1* | 10/2014 | Hennessey ....... G06F 3/013 345/156 |
| 2014/0364761 A1 | 12/2014 | Benson et al. |
| 2015/0077543 A1 | 3/2015 | Kerr et al. |
| 2015/0293588 A1* | 10/2015 | Strupczewski ...... G06F 3/012 382/117 |
| 2016/0150955 A1* | 6/2016 | Kiderman ......... A61B 3/005 351/246 |
| 2017/0135577 A1* | 5/2017 | Komogortsev ..... A61B 5/168 |
| 2017/0151089 A1 | 6/2017 | Chernak |
| 2017/0231490 A1 | 8/2017 | Toth et al. |
| 2017/0249434 A1 | 8/2017 | Brunner |
| 2017/0364732 A1 | 12/2017 | Komogortsev |
| 2018/0018515 A1 | 1/2018 | Spizhevoy et al. |
| 2019/0239790 A1* | 8/2019 | Gross ............... G16H 50/70 |
| 2019/0246969 A1 | 8/2019 | Thomas et al. |
| 2020/0268296 A1 | 8/2020 | Alcaide et al. |
| 2020/0305708 A1 | 10/2020 | Krueger |
| 2020/0323480 A1 | 10/2020 | Shaked et al. |
| 2020/0405148 A1 | 12/2020 | Tran |
| 2021/0174959 A1 | 6/2021 | Abel Fernandez |
| 2021/0186318 A1 | 6/2021 | Yellin et al. |
| 2021/0186395 A1 | 6/2021 | Zakariaie et al. |
| 2021/0186397 A1 | 6/2021 | Weisberg et al. |
| 2021/0228142 A1 | 7/2021 | Sheehy et al. |
| 2021/0248720 A1 | 8/2021 | Ziesche et al. |
| 2021/0327595 A1 | 10/2021 | Abdallah |
| 2022/0019791 A1 | 1/2022 | Drozdov et al. |
| 2022/0180993 A1* | 6/2022 | Kuperman ......... G16H 20/10 |
| 2022/0206571 A1 | 6/2022 | Drozdov et al. |
| 2022/0211310 A1 | 7/2022 | Zakariaie et al. |
| 2022/0236797 A1 | 7/2022 | Drozdov et al. |
| 2022/0301294 A1 | 9/2022 | Boutinon |
| 2022/0313083 A1 | 10/2022 | Zakariaie et al. |
| 2022/0351545 A1 | 11/2022 | Ben-Ami et al. |
| 2022/0390771 A1 | 12/2022 | David et al. |
| 2023/0074569 A1 | 3/2023 | Drozdov et al. |
| 2023/0233072 A1 | 7/2023 | Haimovitch-Yogev et al. |
| 2023/0334326 A1 | 10/2023 | Haimovitch-Yogev et al. |

FOREIGN PATENT DOCUMENTS

| | | |
|---|---|---|
| EP | 1947604 A1 | 7/2008 |
| EP | 3140780 B1 | 11/2020 |
| WO | WO-2020190648 A1 | 9/2020 |
| WO | 2020/235939 A2 | 11/2020 |
| WO | 2021/097300 A1 | 5/2021 |

OTHER PUBLICATIONS

Torres-Salomao, L.A., et al., "Pupil Diameter Size Marker for Incremental Mental Stress Detection," International Conference on E-Health Networking, Application & Services pp. 286-291, (2015).
International Search Report and Written Opinion of the International Searching Authority dated Oct. 27, 2022, Issued in corresponding International Application No. PCT/US2022/027312 (13 pgs.).
Harold E. Bedell et al., "Eye movement testing in clinical examination", Vision Research 90 (2013) pp. 32-37.
Akinyelu, A.A. and Blignaut, P., "Convolutional Neural Network-Based Technique for Gaze Estimation on Mobile Devices," Frontiers in Artificial Intelligence 4:796825 11 pages, Frontiers Media SA, Switzerland (Jan. 2022).
Alnajar, F., et al., "Auto-Calibrated Gaze Estimation Using Human Gaze Patterns," International Journal of Computer Vision 124:223-236, (2017).
Bafna, T., et al., "EyeTell: Tablet-based Calibration-free Eye-typing Using Smooth-pursuit Movements," Proceedings of the ETRA '21 Short Papers, (2021).
Chernov, N., et al., "Fitting Quadratic Curves to Data Points," British Journal of Mathematics & Computer Science 4(1):33-60, (2014).
Guri, M., et al., "Brightness: Leaking Sensitive Data from Air-Gapped Workstations via Screen Brightness," IEEE 12th CMI Conference on Cybersecurity and Privacy 7 pages, (2020).
Hoffner, S., et al., "Gaze Tracking Using Common Webcams," Osnabruck University, (Feb. 2018).
Hou, L., et al., "Illumination-Based Synchronization of High-Speed Vision Sensors," Sensors 10(6):5530-5547, Basel, Switzerland (2010).
Hutt, S. and D'Mello, S.K., "Evaluating Calibration-free Webcam-based Eye Tracking for Gaze-based User Modeling," ICMI '22: Proceedings of the 2022 International Conference on Multimodal Interaction 224-235, (Nov. 2022).
Liu, G., et al., "A Differential Approach for Gaze Estimation," IEEE transactions on pattern analysis and machine intelligence 43(3):1092-1099, IEEE Computer Society, United States (Mar. 2021).
Model, D., "A Calibration Free Estimation of the Point of Gaze and Objective Measurement of Ocular Alignment in Adults and Infants," University of Toronto 160 pages, (2011).
Mollers, Maximilian., "Calibration-Free Gaze Tracking an Experimental Analysis," RWTH Aachen University 111 pages, (2007).
Park, S., et al., "Few-Shot Adaptive Gaze Estimation," Proceedings of the IEEE/CVF International Conference on Computer Vision (ICCV), 13 pages, (2019).
Patel, A.S., et al., "Optical Axes and Angle Kappa," American Academy of Ophthalmology, (Oct. 2021).
Pfeuffer, K., et al., "Pursuit Calibration: Making Gaze Calibration Less Tedious and More Flexible," UIST 13 Proceedings of the 26th Annual Acm Symposium on User Interface Software and Technology 261-270, (Oct. 2013).
Pi, J. and Shi, B.E., et al., "Task-embedded Online Eye-tracker Calibration for Improving Robustness to Head Motion," Proceed-

(56) References Cited

OTHER PUBLICATIONS ings of the 11th ACM Symposium on Eye Tracking Research & Applications ETRA '19 8:1-9, (Jun. 2019).
Smith, J.D., "Viewpointer: Lightweight Calibration-free Eye Tracking for Ubiquitous Handsfree Deixis," UIST 05: Proceedings of the 18th Annual ACM Symposium on User Interface Software and Technology, 84 pages (2005).
Valliappan, N., et al., "Accelerating Eye Movement Research via Accurate and Affordable Smartphone Eye Tracking," Supplementary Information, 18 pages, (Jul. 2020).
Wang, K. and JI, Qiang., "3D Gaze Estimation Without Explicit Personal Calibration," Pattern Recognition 70:216-227, Elsevier, (Jul. 2018).
De Almeida Junior, F.L., et al., "Image Quality Treatment to Improve Iris Biometric Systems," Infocomp Journal of Computer Science 16(1-2):21-30, (2017).
Hooge, I.T.C., et al., "Gaze Tracking Accuracy in Humans: One Eye is Sometimes Better Than Two," Behavior Research Methods 51(6):2712-2721, Springer, United States (Dec. 2019).
Joyce, D.S., et al., "Melanopsin-mediated Pupil Function is Impaired in Parkinson's Disease," Scientific Reports 8(1):7796, Nature Publishing Group, United Kingdom (May 2018).
Kelbsch, C., et al., "Standards in Pupillography," Frontiers in Neurology 10(129):1-26, Frontiers Research Foundation, Switzerland (Feb. 2019).
Schweitzer, R and Rolfs, M., "An Adaptive Algorithm for Fast and Reliable Online Saccade Detection," Behavior Research Methods 52(3):1122-1139, Springer, United States (Jun. 2020).
Villers-Sidani, E.D., et al., "A Novel Tablet-based Software for the Acquisition and Analysis of Gaze and Eye Movement Parameters: a Preliminary Validation Study in Parkinson's Disease," Frontiers in Neurology 14(1204733):1-10 , Frontiers Research Foundation, Switzerland (Jun. 2023).
Villers-Sidani, E.D., et al., "Oculomotor Analysis to Assess Brain Health: Preliminary Findings From a Longitudinal Study of Multiple Sclerosis Using Novel Tablet-based Eye-tracking Software," Frontiers in Neurology 14(1243594):1-11, Frontiers Research Foundation, Switzerland (Sep. 2023).
International Search Report dated Sep. 19, 2022, issued in corresponding International Application No. PCT/US2022/027201 (2 pgs.).
Written Opinion of the International Searching Authority dated Sep. 19, 2022, issued in corresponding International Application No. PCT/US2022/027201 (8 pgs.).
Diana Borza et al., "Real-Time Detection and Measurement of Eye Features from Color Images", Sensors 2016, 16, 1105, pp. 1-24.
Siyuan Chen et al., "Eyelid and Pupil Landmark Detection and Blink Estimation Based on Deformable Shape Models for Near-Field Infrared Video", Frontiers in ICT, Oct. 2019, vol. 6, Article 18, pp. 1-11.
Frank A. Rasulo et al., "Essential Noninvasive Multimodality Neuromonitoring for the Critically Ill Patient", Critical Care, 24, Article No. 100 (2020) 13 pgs.
Jamaludin et al., "Deblurring of noisy iris images in iris recognition," Bulletin of Electrical Engineering and Informatics (BEEI), vol. 10, No. 1, Feb. 2021; pp. 156-159.
Mahanama et al., "Eye Movement and Pupil Measures: a Review," Frontiers in Computer Science, vol. 3, No. 733531; pp. 1-22.
Zammarchi et al., "Application of Eye Tracking Technology in Medicine: a Bibliometric Analysis," Vision, vol. 5, No. 56, Nov. 11, 2021; pp. 1-14.
Fink et al., "From pre-processing to advanced dynamic modeling of pupil data," Behavior Research Methods, Jun. 22, 2023; 37 pages.
Yang et al., "Gaze Angle Estimate and Correction in Iris Recognition," 2014 IEEE Symposium on Computational Intelligence in Biometrics and Identity Management (CIBIM), Dec. 9, 2014; 7 pages.
Lui et al., "Iris Image Deblurring Based on Refinement of Point Spread Function," Chinese Conference on Biometric Recognition (CCBR), Lecture Notes in Computer Science (LNIP, vol. 7701), Dec. 4, 2012; 9 pages.
Zhang et al., "Luminance effects on pupil dilation in speech-in-noise recognition," PLOS One, vol. 17, No. 12, Dec. 2, 2022; pp. 1-18.
Peysakhovich et al., "The impact of luminance on tonic and phasic pupillary responses to sustained cognitive load," International Journal of Psychophysiology, vol. 112, Feb. 2017; pp. 40-45.
Cherng et al., "Background luminance effects on pupil size associated with emotion and saccade preparation," Scientific Reports, vol. 10, No. 15718, Sep. 24, 2020; 12 pages.
Rodrigues A. C., "Response Surface Analysis: a Tutorial for Examining Linear and Curvilinear Effects," Journal of Contemporary Administration, vol. 25, No. 6, Apr. 6, 2021; pp. 1-14.
"System and Method for Measuring Delay from Monitor Output to Camera Sensor," Unpublished Disclosure; 16 pages.
Alessandro Serra et al., "Eye Movement Abnormalities in Multiple Sclerosis: Pathogenesis, Modeling and Treatment", Frontiers in Neurology, vol. 9, No. 31, Feb. 5, 2018; pp. 1-7.
Valliappan et al., "Accelerating eye movement research via accurate and affordable smartphone eye tracking," Nature Communications, vol. 11, No. 4553, Sep. 11, 2020; pp. 1-12.
Strobl et al., "Look me in the eye: evaluating the accuracy of smartphone-based eye tracking for potential application in autism spectrum disorder research," BioMedical Enginering OnLine, vol. 18, No. 1, May 3, 2019; pp. 1-12.
Krafka et al., "Eye Tracking for Everyone," The IEEE Conference on Computer Vision and Pattern Recognition (CVPR), Jun. 18, 2016; 9 pages.
Lai et al., "Measuring Saccade Latency Using Smartphone Cameras," IEEE Journal of Biomedical and Health Informatics, Apr. 30, 2019; pp. 1-13.
Aljaafreh et al., "A Low-cost Webcam-based Eye Tracker and Saccade Measurement System," International Journal of Circuits, Systems and Signal Processing, vol. 14, Apr. 2020; pp. 102-107.
Em Frohman et al., "Quantitative oculographic characterisation of internuclear ophthalmoparesis in multiple sclerosis: the versional dysconjugacy index Z score," Journal of Neurology, Neurosurgery, and Psychiatry, vol. 73, No. 1, Aug. 2002; pp. 51-55.
Fielding et al., "Ocular motor signatures of cognitive dysfunction in multiple sclerosis," Nature Reviews Neurology, vol. 11, No. 11, Sep. 15, 2015; 10 pages.
Nij Bijvank et al., "Quantification of Visual Fixation in Multiple Sclerosis", Investigative Ophthalmology & Visual Science, vol. 60, No. 5, Apr. 2019; pp. 1372-1383.
Alessandro Grillini et al., "Eye Movement Evaluation in Multiple Sclerosis and Parkinson's Disease Using a Standardized Oculomotor and Neuro-Ophthalmic Disorder Assessment (SONDA)", Frontiers in Neurology, vol. 11, No. 971, Sep. 8, 2020; pp. 1-15.
Christy K. Sheehy et al., "Fixational microsaccades: a quantitative and objective measure of disability in multiple sclerosis", Multiple Sclerosis Journal, vol. 26, No. 3, Feb. 2020; pp. 1-11.
Nathaniel Lizak et al., "Impairment of Smooth Pursuit as a Marker of Early Multiple Sclerosis", Frontiers in Neurology, vol. 7, No. 3, Nov. 2016; pp. 1-7.
Marisa Ferreira et al., "Using endogenous saccades to characterize fatigue in multiple sclerosis", Multiple Sclerosis and Related Disorders, vol. 14, May 2017; pp. 1-7.
En et al., "Pupillary response to sparse multi focal stimuli in multiple sclerosis patients". Multiple Sclerosis Journal, vol. 20, No. 7, Nov. 21, 2013; pp. 1-8.
De Seze J. et al., "Pupillary disturbances in multiple sclerosis: correlation with MRI findings". Journal of the Neurological Sciences, vol. 188, Nos. 1-2, Jul. 15, 2001; pp. 37-41.
Polak PE et al., "Locus coeruleus damage and noradrenaline reductions in multiple sclerosis and experimental autoimmune encephalomyelitis," Brain, vol. 134, No. 3, Feb. 2011; pp. 665-677.
Niestroy A. et al., "Neuro-ophthalmologic aspects of multiple sclerosis: using eye movements as a clinical and experimental tool," Clinical Ophthalmology, vol. 1, No. 3, Sep. 2007; pp. 267-272.

(56) References Cited

OTHER PUBLICATIONS

Servillo G. et al., "Bedside tested ocular motor disorders in multiple sclerosis patients". Multiple Sclerosis International, vol. 5, Apr. 2014; 5 pages.

T. C. Frohman et al., "Accuracy of clinical detection of INO in MS: corroboration with quantitative infrared oculography," Neurology, vol. 61, No. 6, Oct. 2003; pp. 848-850.

Van Munster C. E. P. et al., "Outcome Measures in Clinical Trials for Multiple Sclerosis". CNS Drugs, vol. 31, No. 3, Feb. 9, 2017; pp. 217-236.

Tur C et al., "Assessing treatment outcomes in multiple sclerosis trials and in the clinical setting," Nature Reviews Neurology, vol. 14, Jan. 12, 2018; 164 pages.

Matza LS et al., "Multiple sclerosis relapse: Qualitative findings from clinician and patient interviews" Multiple Sclerosis and Related Disorders, vol. 27, Jan. 2019; 27 pages.

Felmingham K., "Comprehensive Guide to Post-Traumatic Stress Disorder: Chapter 69: Eye Tracking and PTSD," Jan. 1, 2015; pp. 1241-1256.

Holzman et al., "Eye-Tracking Dysfunctions in Schizophrenic Patients and Their Relatives," Archives of General Psychiatry, vol. 31, Aug. 1974; pp. 143-151.

Rayner K., "Eye Movements in Reading and Information Processing: 20 Years of Research," Psychological Bulletin, vol. 124, No. 3, Nov. 1998; pp. 372-422.

Frohman et al., "The neuro-ophthalmology of multiple sclerosis", The Lancet Neurology, vol. 4, No. 2, Feb. 2005; pp. 111-121.

Serra et al., "Role of eye movement examination and subjective visual vertical in clinical evaluation of multiple sclerosis", Journal of Neurology, vol. 250, No. 5, May 2003; pp. 569-575.

Jakobsen J., "Pupillary function in multiple sclerosis" Acta Neurologica Scandinavica, vol. 82, No. 6, Dec. 1990; pp. 392-395.

Derwenskus J. et al., "Abnormal eye movements predict disability in MS: two-year follow-up". Annals of the New York Academy of Sciences, vol. 1039, Apr. 2005; pp. 521-523.

Romero K. et al., "Neurologists' accuracy in predicting cognitive impairment in multiple sclerosis" Multiple Sclerosis and Related Disorders, vol. 4, No. 4, Jul. 2015; pp. 291-295.

Ahmad Hasasneh et al., "Deep Learning Approach for Automatic Classification of Ocular and Cardiac Artifacts in MEG Data", Hindawi Journal of Engineering, vol. 2018, Apr. 30, 2018, 10 pgs.

Christian Johannes Schuler, "Machine Learning Approaches to Image Deconvolution", Dissertation University of Tubingen, Germany, 2017, 142 pgs.

Petteri Teikari et al., "Embedded Deep Learning in Ophthalmology: Making Ophthalmic Imaging Smarter", Therapeutic Advances in Ophthalmology 11 (2019), 21 pgs.

Bryan M. Williams et al., "Fast Blur Detection and Parametric Deconvolution of Retinal Fundus Images", Fetal, Infant and Ophthalmic Medical Image Analysis, Springer, Cham. 2017, 8 pgs.

\* cited by examiner

SYNCHRONIZING EYE MOVEMENT PARAMETERS FOR A DELAY FROM A MONITOR OUTPUT TO A SENSOR

CROSS REFERENCE TO RELATED PATENT APPLICATIONS

This patent application claims the benefit of U.S. Provisional Patent Application No. 63/183,388, entitled "MEASURING HIGH RESOLUTION EYE MOVEMENTS USING BLIND DECONVOLUTION TECHNIQUES," filed on May 3, 2021, which is incorporated by reference herein in its entirety.

BACKGROUND

Several papers have been published which demonstrate the connections between minute eye movements and the progression of neurological disorders (see, for example, References section below). Typically, these eye movements are measured in well-controlled lab settings (e.g., no movements, controlled ambient light, or other such parameters) using dedicated devices (e.g., infrared eye trackers, pupilometers, or other such devices), which is a challenge to set up, cost prohibitive, or may involve a significant amount of time and effort to create or maintain the controlled setup. Some prior technologies use neural networks to obtain these eye movements but do not attain the needed resolution for measurements (e.g., around 0.1 mm or greater, higher, or finer resolution). Additionally, prior technologies focus on measuring reactions of the eye to specific standardized stimuli (e.g., controlled light stimulus, stimulus provided to measure specific parameters, stimulus that a patient needs to me made aware of, or other such stimulus) with controlled ambient conditions. These and other drawbacks exist.

SUMMARY

Disclosed embodiments relate to systems and methods for facilitating measurement of minute eye parameters or movements with video captured by standard cameras (e.g., smartphone camera, webcam, or another video capturing device) and without the need for controlled settings. The embodiments obtain various high resolution oculometric parameters. For example, the embodiments may obtain eyelid data, such as coordinates of eyelid boundaries. In another example, the embodiments obtain iris data such as iris translation or iris center, iris rotation, iris radius, iris visible fraction, or iris coverage asymmetry. In yet another example, the embodiments obtain pupil data such as a pupil center, a pupil radius, a pupil visible fraction, or a pupil coverage asymmetry. The oculometric parameters are obtained at a high resolution, for example, at a sub-pixel level, 0.1 mm, or other greater, higher, or finer resolution. In some embodiments, the oculometric parameters may be used in determining eye movement measurements, such as pupillary response parameter, gaze, saccade, fixation, etc., which may be used to produce digital biomarkers that may further be used to predict, diagnose or measure progress of a neurological condition or disorder. The digital biomarkers are objective, sensitive, accurate, correlated with disease progression, and may be conducted remotely and even in a distributed manner. The oculometric parameters or eye movement parameters may be obtained using non-standard stimulus presented to the user on a user device (e.g., stimulus that a patient need not be made aware of, stimulus that may be used to measure multiple parameters, stimulus such as a video playing on a display device being observed by the user, or other such stimulus that does not need controlled ambient lighting conditions).

In some embodiments, the disclosed embodiments may use probabilistic methods (e.g., maximum likelihood estimate, or other such method) or signal processing methods (e.g., blind deconvolutions, or other such method) to increase resolution and ascertain oculometric parameters, eye movement parameters at a very high resolution (e.g., at a sub-pixel level, 0.1 mm, or other greater, higher, or finer resolution) on layers of data present in video frame sequences of eye movements captured by standard cameras in uncontrolled settings. The disclosed embodiments may employ prediction models (e.g., machine learning (ML) models such as neural networks) to obtain one or more oculometric parameters at high resolution.

In some embodiments, the disclosed embodiments obtain high resolution eye movement parameters, which may be used to produce digital biomarkers that may further be used to diagnose or measure progress of a neurological condition or disorder. The eye movement parameters may be obtained, derived, or determined based on the high resolution oculometric parameters discussed above. For example, eye movement parameters such as saccade, anti-saccade, fixation, or smooth pursuit may be obtained using the oculometric parameters. In some embodiments, saccade parameters or information, which may be indicative of a rapid movement of the eye, may include at least one of saccade latency, saccade amplitude, saccade peak velocity, saccade overshoot amplitude, or saccade correction time. In some embodiments, anti-saccade parameters or information, which may be indicative of a movement of the eye in a direction opposite to a side where a target is presented in a video stimulus displayed on the client device, may include at least one of anti-saccade latency, anti-saccade amplitude, anti-saccade peak velocity, anti-saccade overshoot amplitude, anti-saccade correction time, anti-saccade direction confusion rate, or anticipated anti-saccade. In some embodiments, fixation parameters or information, which may be indicative of an ability of the eye to maintain a gaze on a single location in the video stimulus, may include at least one of micro-saccade amplitude distribution, square wave jerk (SWJ) frequency, SWJ amplitude, or SWJ offset duration. In some embodiments, smooth pursuit parameters or information, which may be indicative of a type of eye movement (e.g., smooth and gradual movement as opposed to rapid movement in saccade) in which the eyes remain fixated on a moving object in the video stimulus, may include at least one of (a) a classification of the eye movements into saccade, fixation or smooth pursuit, (b) saccadic movement amplitude percentage, (c) smooth movement amplitude percentage, (d) saccadic movement temporal percentage, (e) fixation temporal percentage, or (f) smooth movement temporal percentage.

In some embodiments, prior to generating the eye movement parameters, the oculometric parameters may be up sampled to increase a temporal resolution of the oculometric parameters, and then synchronized with video stimulus presented on the display of the user device to further improve the accuracy (e.g., a time component) of the eye movement parameters. The synchronized time series data of the oculometric parameters may then be used to generate the eye movement parameters.

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
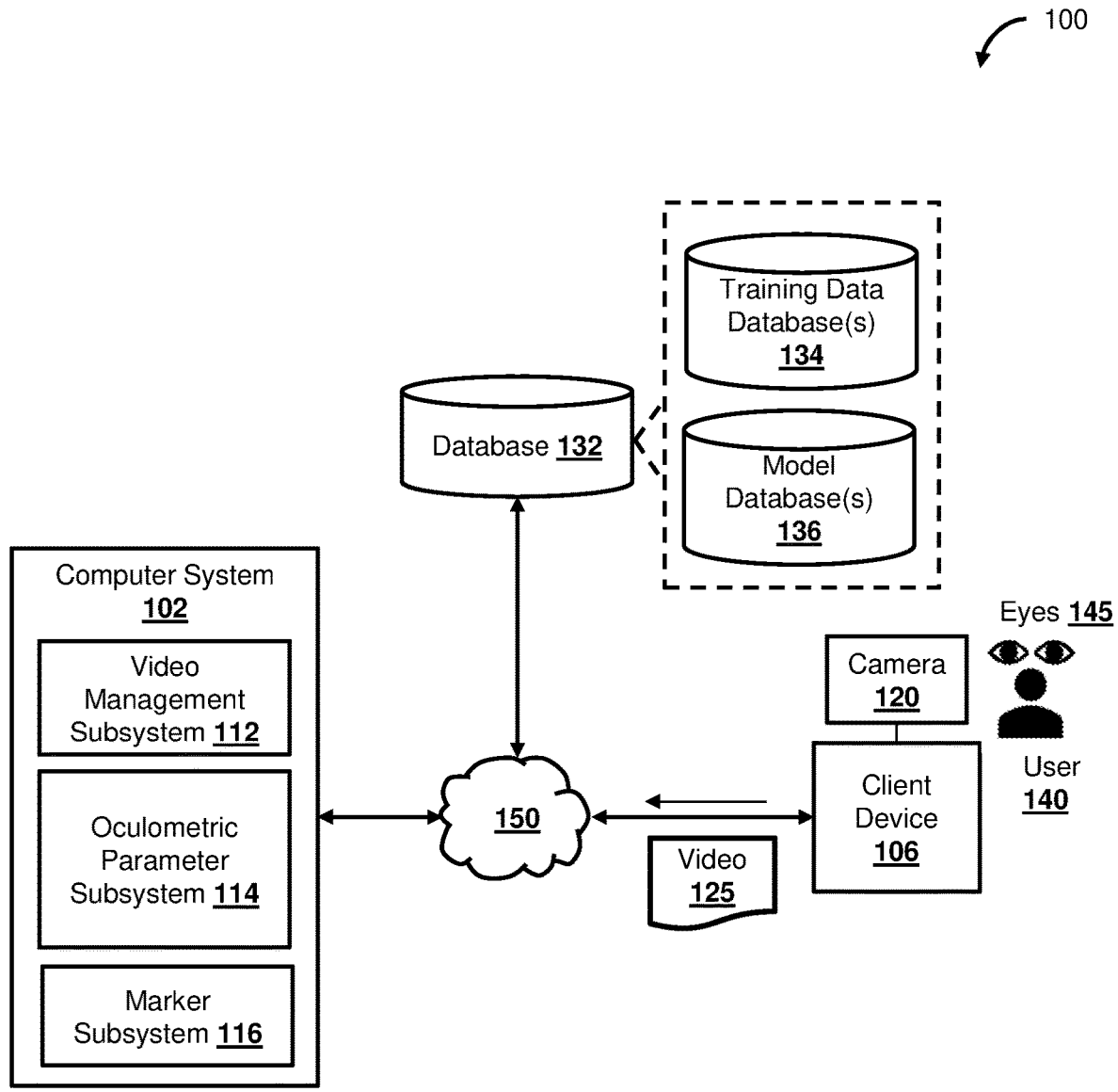
FIG. 1A shows a system for facilitating measurement of oculometric parameters and eye movements of a user, consistent with various embodiments.
Figure 1B:
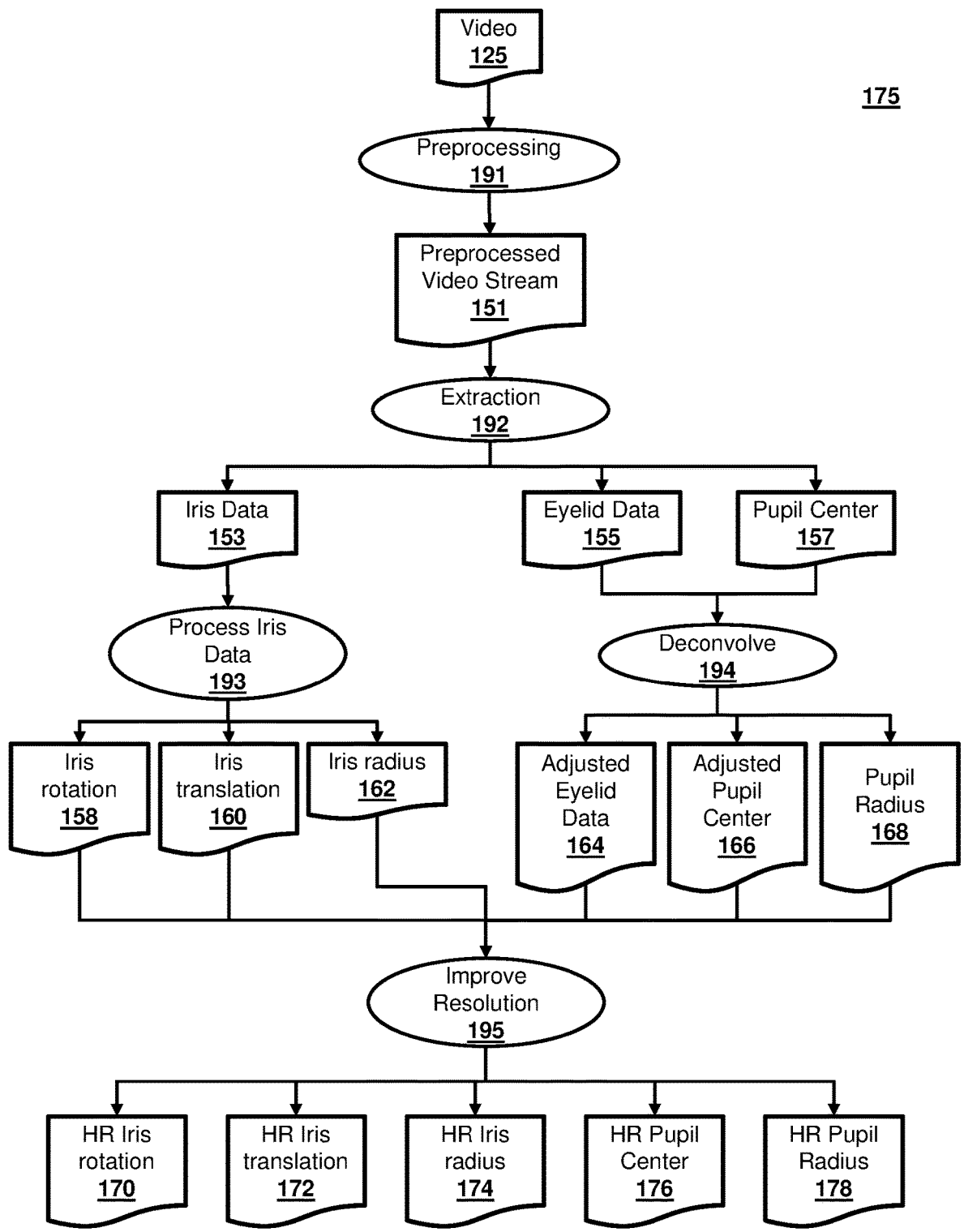
FIG. 1B shows a process of extracting high resolution (HR) oculometric parameters associated with an eye, consistent with various embodiments.

FIG. 1A shows a system 100 for facilitating measurement of oculometric parameters and eye movements of a user, consistent with various embodiments. FIG. 1B shows a process 175 of extracting high resolution (HR) oculometric parameters associated with an eye, consistent with various embodiments. As shown in FIG. 1A, system 100 may include computer system 102, client device 106, or other components. By the way of example, computer system 102 may include any computing device, such as a server, a personal computer (PC), a laptop computer, a tablet computer, a hand-held computer, or other computer equipment. Computer system 102 may include video management subsystem 112, oculometric parameter subsystem (OPS) 114, marker subsystem 116, or other components. The client device 106 may include any type of mobile terminal, fixed terminal, or other device. By way of example, client device 106 may include a desktop computer, a notebook computer, a tablet computer, a smartphone, a wearable device, or other client device. A user, e.g., user 140, may, for instance, utilize the client device 106 to interact with one or more servers, or other components of system 100. The camera 120 may capture still or video images of the user 140, e.g., a video of the face of the user 140. The camera 120 may be integrated with the client device 106 (e.g., smartphone camera) or may be a standalone camera (e.g., webcam or other such camera) that is connected to the client device 106.

A component of system 100 may communicate with one or more components of system 100 via a communication network 150 (e.g., Internet, a mobile phone network, a mobile voice or data network, a cable network, a public switched telephone network, or other types of communications network or combinations of communications networks). The communication network 150 may be a wireless or wired network. As an example, the client device 106 and the computer system 102 may communicate wirelessly.

It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 106.

It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 facilitates determination of oculometric parameters 170-178 of a user 140 at a high resolution (e.g., sub-pixel level, 0.1 mm or other greater, higher, finer resolution) using a video stream 125 (e.g., a sequence of frames of an image of the eye) of the eye movements captured by the camera 120. The video management subsystem 112 obtains the video stream 125 from the client device 106 and stores the video stream 125 in the database 132. The OPS 114 processes the video stream 125 to extract the oculometric parameters, such as (i) pupil center 176, (ii) pupil radius 178, (iii) iris radius 174, (iv) iris translation 172, and (v) iris rotation 170 of each of the eyes, among other parameters, at a high resolution. These oculometric parameters may be used to determine eye movement parameters (e.g., pupillary response parameters and gaze parameters) that are indicative of eye movements responsive to non-standard stimuli (e.g., a video stimuli or image stimuli displayed on the client device 106). The marker subsystem 116 may produce digital biomarkers (e.g., parameters) based on the eye movement parameters that may act as an indicator of one or more neurological disorders.

The video management subsystem 112 may store the video stream 125 in the database 132 in any of several formats (e.g., WebM, Windows Media Video, Flash Video, AVI, QuickTime, AAC, MPEG-4, or another file format). The video management subsystem 112 may also provide the video stream 125 as an input (e.g., in real-time) to the OPS 114 for generating the oculometric parameters. In some embodiments, the video management subsystem 112 may perform preprocessing 191 of the video stream 125 to convert the video stream 125 to a format that is suitable for oculometric parameter extraction by the OPS 114. For example, the video management subsystem 112 may perform an extract, transform and load (ETL) process on the video stream 125 to generate a preprocessed video stream 151 for the OPS 114. The ETL process is typically a multi-phase process where data is first extracted then transformed (e.g., cleaned, sanitized, scrubbed) and finally loaded into a target system. The data may be collated from one or more sources, and it may also be outputted to one or more destinations. In one example, the ETL process performed by the video management subsystem 112 may include adjusting color and brightness (e.g., white balance) in the video stream 125. In another example, the ETL process may include reducing noise from the video stream 125. In yet another example, the ETL process may include improving resolution of the video stream 125 based on multi-frame data, for example, by implementing one or more multi-frame super-resolution techniques that recover a high-resolution image (or a sequence) from a sequence of low-resolution images. In some embodiments, super-resolution is a digital image processing technique to obtain a single high-resolution image (or a sequence) from multiple blurred low-resolution images. The basic idea of super-resolution is that the low-resolution images of the same scene contain different information because of relative subpixel shifts; thus, a high-resolution image with higher spatial information can be reconstructed by image fusion. The video management subsystem 112 may perform the above preprocessing operations and other such similar preprocessing operations to generate a preprocessed video stream 151 that is of a format suitable for the OPS 114 to perform the oculometric parameter extraction.

In some embodiments, the video management subsystem 112 may obtain the preprocessed video stream 151 via a prediction model (e.g., based on the video stream 125 obtained from the client device 106). As an example, the video management subsystem 112 may input the video stream 125 obtained from the client device 106 to the prediction model, which then outputs the preprocessed video stream 151. In some embodiments, the system 100 may train or configure a prediction model to facilitate the generation of a preprocessed video stream. In some embodiments, system 100 may obtain a video stream from a client device associated with a user (e.g., video stream 125 having a video of a face of the user 140) and provide such information as input to a prediction model to generate predictions (e.g., preprocessed video stream 151 in which color or brightness are adjusted, resolution of the video is improved, etc.). System 100 may provide reference feedback to the prediction model and the prediction model may update one or more portions of the prediction model based on the predictions and the reference feedback. As an example, where the prediction model generates predictions based on video stream obtained from a client device, one or more preprocessed video streams associated with such input video streams may be provided as reference feedback to the prediction model. As an example, a particular preprocessed video stream may be verified as a suitable video stream for oculometric parameter extraction by the OPS 114 (e.g., via user confirmation of the preprocessed video, via one or more subsequent actions demonstrating such goal, etc.) based on one or more user responses or one or more other user actions via one or more services. The foregoing user input information may be provided as input to the prediction model to cause the prediction model to generate predictions of the preprocessed video stream, and the verified preprocessed video stream may be provided as reference feedback to the prediction model to update the prediction model. In this way, for example, the prediction model may be trained or configured to generate more accurate predictions. In some embodiments, the training dataset may include several data items in which each data item includes at least a video obtained from a client device and a corresponding preprocessed video as the ground truth.

In some embodiments, the foregoing operations for updating the prediction model may be performed with a training dataset with respect to one or more users (e.g., a training dataset associated with a given user to specifically train or configure the prediction model for the given user, a training dataset associated with a given cluster, demographic, or other group to specifically train or configure the prediction model for the given group, a training dataset associated with any given set of users, or other training dataset). As such, in some embodiments, subsequent to the updating of the prediction model, system 100 may use the prediction model to facilitate generation of a preprocessed video stream for facilitating oculometric parameter extraction by the OPS 114.

The video management subsystem 112 may generate the preprocessed video stream 151 prior to inputting the video stream 125 to the OPS 114, or after storing the video stream 125 in the database 132. Further, the video management subsystem 112 may also store the preprocessed video stream 151 in the database 132 along with the video stream 125.

The OPS 114 may process the video stream 125 or the preprocessed video stream 151 to extract, determine, derive, or generate the oculometric parameters (e.g., oculometric parameters 170-178), which are characteristic of the eyes 145 of the user 140. In some embodiments, the oculometric parameters include parameters such as (i) a pupil center 176, (ii) a pupil radius 178, (iii) an iris radius 174, (iv) an iris translation 172, and (v) an iris rotation 170. The pupil center 176 is a center of the pupil and may be represented using coordinates (e.g., three-dimensional (3D) lateral displacement vector (x,y,z)) that identifies a location of the pupil center in a coordinate system. The pupil radius 178 may be a radius of the pupil and may be represented as a scalar with distance units. The iris translation 172 (or iris translation 160) is a center of the iris and may be represented using coordinates (e.g., 3D lateral displacement vector (x,y,z)) that identify a location of the iris center in a coordinate system. The iris radius 174 (or iris radius 162) may be a radius of the iris and may be represented as a scalar with distance units. In some embodiments, the iris radius 174 is assumed to have a small variance in the human population (e.g., 10%-15% considering iris radius varies from 11 mm-13 mm among the human population). The iris rotation 170 (or iris rotation 158) is representative of a rotation of the iris and is retrieved as the iris normal vector (e.g., perpendicular to the iris circle plain). In some embodiments, the iris rotation 170 may be projected to a 3D vector in a device coordinate system (e.g., x, y, z) or represented by a 2D vector in a head coordinate system (e.g., azimuth angle and elevation angle). In some embodiments, the OPS 114 may obtain the coordinates of the oculometric parameters in one or more coordinate systems, such as the device coordinate system or the head coordinate system illustrated in FIGS. 3A and 3B, respectively.

Figure 3A:
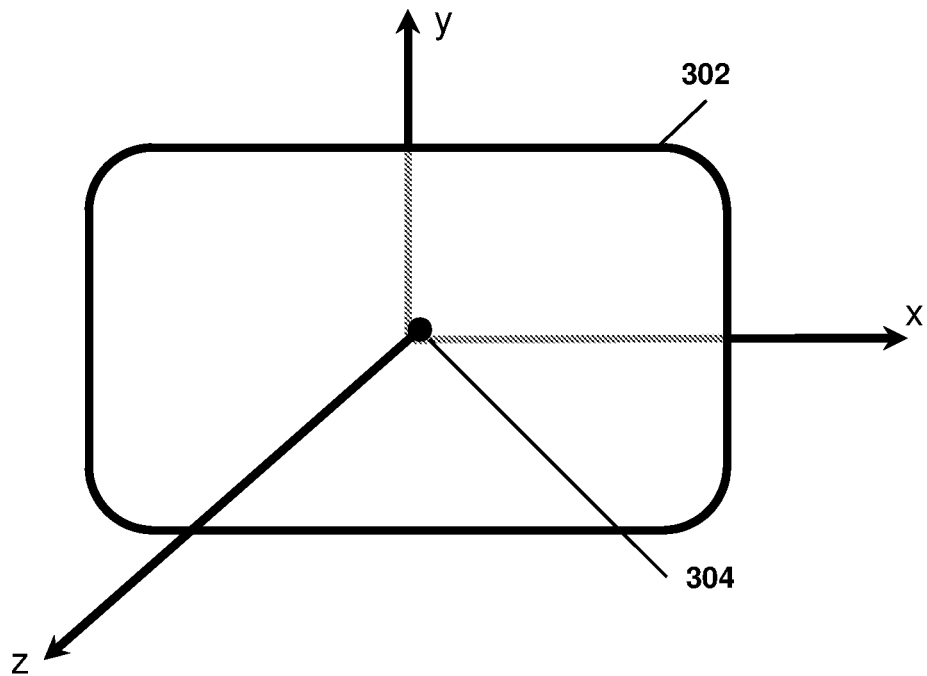
FIG. 3A illustrates a device coordinate system, consistent with various embodiments.

FIG. 3A illustrates a device coordinate system, consistent with various embodiments. In some embodiments, the device coordinate system is a cartesian coordinate system, with a center of a display 302 of a client device (e.g., the client device 106) considered as an origin 304 having the (x,y,z) coordinates as (0,0,0). The device coordinate system defines the three orthogonal axes, e.g., x-axis in the direction of the horizontal edge of the display 302, y-axis in the direction of the vertical edge of the display 302 and perpendicular to the x-axis, and z-axis in a direction perpendicular to the plane of the display 302.

Figure 3B:
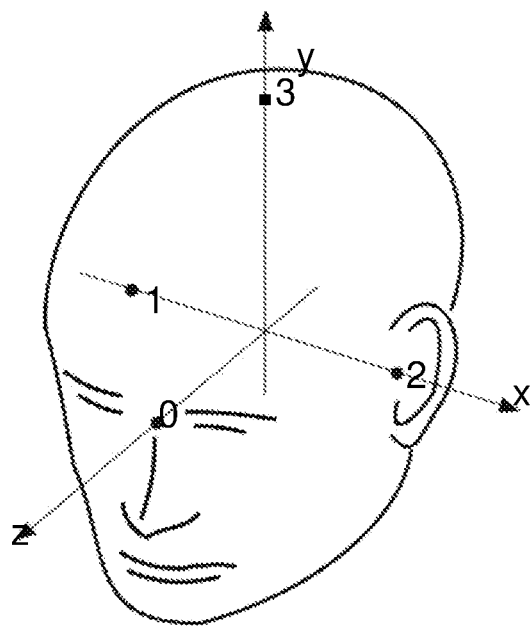
FIG. 3B illustrates a head coordinate system, consistent with various embodiments.

FIG. 3B illustrates a head coordinate system, consistent with various embodiments. In some embodiments, the head coordinate system is defined by a plane that contains the following points in the face bounding polygon: most left, most right and most upper (points 1, 2 and 3 in FIG. 3B) detectable points in the face polygon. For example, the upper most point 3 may be defined as the most upper detectable point in the face bounding polygon and may be located in the cross-section between the y-axis and the head. When obtaining a face image, it is The horizontal axis (x) may be defined as the line between the most left and the most right points, and the perpendicular vector to that line on the defining plane may be defined as the vertical axis (y). The depth axis (z) may be orthogonal to both the x and y axes. The origin of the head coordinate system (point 0 in the FIG. 3B) is located in the center between the eyes, as projected on the defining plane by displacement on the z-direction. In some embodiments, the iris rotation may be represented on the head coordinate system as the eyeball rotation, given two angles (e.g., azimuth and elevation).

Referring to the OPS 114, the OPS 114 may be configured to represent the coordinates of the oculometric parameters in any of the coordinate systems, including the head coordinate system or the device coordinate system. Further, the OPS 114 may be configured to convert the coordinates from one coordinate system to another, such as from the head coordinate system to the device coordinate system or vice versa.

The OPS 114 may also obtain eyelid data 164, such as coordinates of the upper eyelid boundary and lower eyelid boundary of both the eyes. The eyelid data 164 may be used in determining, or in improving the accuracy of, the oculometric parameters. In some embodiments, the OPS 114 may obtain the above data (e.g., oculometric parameters 170-178, eyelid data 164 or other data) as time series data. For example, the OPS 114 may extract a first set of values of the oculometric parameters 170-178 for a first moment in time of the video stream 125, a second set of values of the oculometric parameters 170-178 for a second moment in time of the video stream 125 and so on. That is, the OPS 114 may continuously extract the oculometric parameters 170-178 at a specified time interval (e.g., every millisecond, every few milliseconds, or other temporal resolution). Further, the OPS 114 may obtain the above data for one or both the eyes 145 of the user 140.

The OPS 114 may perform several processes to extract the above oculometric parameters (e.g., oculometric parameters 170-178) from the preprocessed video stream 151. For example, in an extraction process 192, the OPS 114 may obtain a first set of oculometric parameters, such as iris data 153, eyelid data 155 and pupil center 157. In some embodiments, the OPS 114 may use computer vision techniques on the preprocessed video stream 151 to model the translation and rotation of a face of the user 140 with respect to the camera 120 and to identify the eyes and the mouth in the face. After identifying the position of the eyes, the OPS 114 may obtain the eyelid data 155 (e.g., coordinates of an array of points that describe a polygon representing the eye lids) for each frame (e.g., using the fact that their edge may be approximated with quadratic functions). In some embodiments, the OPS 114 may determine the iris data 153 (e.g., a shape, such as an ellipsoid, representing the iris) by determining the pixels that are in or out of the iris radius at any moment in time based on the eyelid's location as a time series. In some embodiments, the OPS 114 may be configured to consider that the iris and pupil are ellipsoids with a relatively uniform and dark color compared to the sclera (e.g., the white part of the eye) in determining the pixels that are in or out. The iris data 153 may include several coordinates such as a first coordinate and a second coordinate, which correspond to coordinates of right and left bounding points of a shape representing the iris (e.g., an ellipse); a third coordinate and fourth coordinate, which correspond to coordinates of top and bottom bounding points of the shape; and a fifth coordinate corresponding to a center of the iris. The pupil center 157 may also be determined based on the time series of the eyelid data 155 and iris data 153. In some embodiments, the pupil center 157 may include a coordinate representing a location of the center of the pupil.

In some embodiments, the OPS 114 may implement a prediction model in the extraction process 192 and may obtain the first set of oculometric parameters via the prediction model (e.g., based on the video stream 125 or the preprocessed video stream 151). As an example, the OPS 114 may input the video stream 125 or the preprocessed video stream 151 to the prediction model, which then outputs the first set of oculometric parameters. In some embodiments, the system 100 may train or configure a prediction model to facilitate the generation of the first set of oculometric parameters. In some embodiments, system 100 may obtain a video stream having a video of the face of a user (e.g., video stream 125 or preprocessed video stream 151) and provide such information as input to a prediction model to generate predictions (e.g., first set of oculometric parameters such as iris data, eyelid data, pupil center, etc.). System 100 may provide reference feedback to the prediction model and the prediction model may update one or more portions of the prediction model based on the predictions and the reference feedback. As an example, where the prediction model generates predictions based on the video stream 125 or the preprocessed video stream 151, the first of oculometric parameters associated with such input video streams may be provided as reference feedback to the prediction model. As an example, a particular set of oculometric parameters may be verified as an appropriate set of oculometric parameters (e.g., via user confirmation of the set of oculometric parameters, via one or more subsequent actions demonstrating such goal, etc.). The foregoing user input information may be provided as input to the prediction model to cause the prediction model to generate predictions of the first set of oculometric parameters, and the verified set of oculometric parameters may be provided as reference feedback to the prediction model to update the prediction model. In this way, for example, the prediction model may be trained or configured to generate more accurate predictions.

In some embodiments, the foregoing operations for updating the prediction model may be performed with a training dataset with respect to one or more users (e.g., a training dataset associated with a given user to specifically train or configure the prediction model for the given user, a training dataset associated with a given cluster, demographic, or other group to specifically train or configure the prediction model for the given group, a training dataset associated with any given set of users, or other training dataset). As such, in some embodiments, subsequent to the updating of the prediction model, system 100 may use the prediction model to facilitate generation of a first set of oculometric parameters.

In some embodiments, the OPS 114 may also further adjust, modify, or correct the first set of parameters based on other factors, such as optometric data associated with a user. For example, the user 140 may have certain vision conditions such as myopia, hyperopia, astigmatism or other vision conditions and the user may wear corrective lenses such as eyeglasses or contact lens. The OPS 114 may consider such optometric conditions of the user 140 and correct, adjust or modify, values of one or more of the first set of oculometric parameters. In some embodiments, the OPS 114 may obtain the optometric data associated with the user 140 from user profile data (e.g., stored in the database 132).

In some embodiments, the OPS 114 may further process 193 the iris data 153 to extract iris related parameters such as iris rotation 158, iris translation 160 and iris radius 162. In some embodiments, the above iris related parameters are obtained using an ML technique. For example, the OPS 114 may implement a maximum likelihood estimation (MLE) based curve fitting method to estimate the iris related parameters. The iris data is provided as input to the MLE-based curve fitting method (e.g., oval fit—based on an assumption that iris is circular and so when projected onto a 2D plane it is oval/ellipse), which generates the above iris related parameters. In some embodiments, in statistics, MLE is a method of estimating the parameters of a probability distribution by maximizing a likelihood function, so that under the assumed statistical model the observed data is most probable. The point in the parameter space that maximizes the likelihood function is called the maximum likelihood estimate. In some embodiments, curve fitting operation is a process of constructing a curve, or mathematical function, that has the best fit to a series of data points, subject to constraints (e.g., oval fit). Curve fitting may involve either interpolation, where an exact fit to the data is required, or smoothing, in which a "smooth" function is constructed that approximately fits the data. Fitted curves may be used as an aid for data visualization, to infer values of a function where no data are available, and to summarize the relationships among two or more variables.

In some embodiments, by performing the MLE-based curve fitting operation the accuracy of at least some of the iris related parameters may be further improved. For example, the shape depicting the iris boundary is further improved from the coordinates of the shape in the iris data 153, and therefore an improved or more accurate iris radius 162 may be determined. In some embodiments, the iris translation 160, also referred to as iris center, is similar to the coordinates of the iris center in the iris data 153. In some embodiments, in the process 193, the OPS 114 may consider different iris centers, construct an iris shape for each of the candidate iris centers, and assign a confidence score for each of the shapes. Such a method may be repeated for different iris centers, and the shape having a score satisfying a score criterion (e.g., the best score) is selected. In some embodiments, the score for each iteration may reflect a log-likelihood of the examined parameter set (e.g., coordinates of the iris shape, radius, and center), based on the known physical constraints and assumptions. In some embodiments, the physical constraints and assumptions may improve the efficiency of the MLE process by introducing better estimated initial conditions before iterating towards convergence. For example, some assumptions may include that: the iris is circular (which when projected on a plane as 2D is represented as ellipse/oval, iris center is expected at the centroid of the circles, high contrast between iris and sclera, degree of similarity of orientation between left and right eye, stimulus-based assumption on the expected gaze point, and brightness of a display of the client device on which a video stimulus is shown to the user. In some embodiments, examples of physical constraints may include: pupil dilation dependence in overall brightness (light conditions), limited range of face orientation as users look at the display, blinking may initiate uncertainty due to readjustment time, or physical possible range of motion (both face and eyeball).

The OPS 114 may perform a deconvolution process 194 on the video stream 125 or the preprocessed video stream 151 to adjust (e.g., improve the resolution or increase the accuracy of) some oculometric parameters, such as the eyelid data 155 and pupil center 166, and determine other oculometric parameters, such as the pupil radius. In some embodiments, the OPS 114 may perform a blind deconvolution process to improve the accuracy of the oculometric parameters. In image processing, blind deconvolution is a deconvolution technique that permits recovery of the target scene from a single or a set of "blurred" images in the presence of a poorly determined or unknown point spread function (PSF). Regular linear and non-linear deconvolution techniques may utilize a known PSF. For blind deconvolution, the PSF is estimated from the image or image set, allowing the deconvolution to be performed. Blind deconvolution may be performed iteratively, whereby each iteration improves the estimation of the PSF and the scene, or non-iteratively, where one application of the algorithm, based on exterior information, extracts the PSF. After determining the PSF, the PSF may be used in deconvolving the video stream 125 or the preprocessed video stream 151 to obtain the adjusted oculometric parameters (e.g., adjusted eyelid data 164, adjusted pupil center 166 or pupil radius 168). In some embodiments, the blind deconvolution process may be used to obtain the adjusted oculometric parameters without reconstructing high resolution images or frames of the video stream 125.

In some embodiments, applying blind deconvolution algorithm may help in decreasing or removing the blurring in the images/video, and in estimating irradiance (e.g., based on parameters of the deduced convolution vector (e.g., PSF)). In some embodiments, the estimated irradiance is an estimated irradiance reflected from the eye of the user 140, which is an indication of the irradiance the eyes are exposed to. After the blurring is reduced or removed and the irradiance is obtained, the deconvolution process may be repeated one or more times to obtain adjusted oculometric parameters (e.g., whose accuracy or resolution is improved compared to oculometric parameters prior to the deconvolution process 194).

In some embodiments, in determining the PSF, the blind deconvolution process considers various factors. For example, the OPS 114 may input (a) the video stream 125 or the preprocessed video stream 151 (e.g., which is a time-series image sequence) with high temporal resolution (e.g., equal to or faster than 30 ms per frame); (b) stimulus data such as spatio-temporal information on a stimulus presented on the display of the client device 106, and optical properties information on the of the stimulus, including spectral properties (e.g., color) and intensity (e.g., brightness); (c) environment data such as lighting in the environment (e.g., a room) where the user is located, which can be measured using information obtained from the camera 120, (d) device data such as orientation information of the client device 106, information from one or more sensors associated with the client device 106 such as acceleration sensors. Such factors help in efficient calculation of the PSF, minimizes the noise uncertainty, leading to better accuracy in the overall deconvolution.

In some embodiments, the deconvolution process 194 is integrated with an MLE process to further improve the accuracy of the oculometric parameters. For example, the MLE process may be used to improve the accuracy of the eyelid data 155. As described above, the eyelid data 155 includes coordinates of an array of points that describe a shape (e.g., polygon) of the eyelids. The MLE process performs a parabolic curve fitting operation on the eyelid data 155 with a constraint that the eyelids are parabolic in shape to obtain a more accurate representation of the eyelids, as the adjusted eyelid data 164. In some embodiments, the adjusted eyelid data 164 may include coordinates of a collection of points that describe a shape (e.g., parabolic) of an eyelid. Such adjusted eyelid data 164 may be obtained for both eyelids of the eye and for both eyes. In some embodiments, the OPS 114 may use the adjusted eyelid data 164 information to predict the precise oculometric parameter values, such as the pupil radius center, even when some are physically challenging (e.g., when the upper eyelid covers the pupil center, or when only some of the iris is exposed to the camera.

In some embodiments, the MLE process may also be used for obtaining or improving pupil related data, such as pupil radius 168. In some embodiments, by performing the MLE-based curve fitting operation the accuracy of the pupil related data may be further improved. In some embodiments, in the MLE process, the OPS 114 may consider different pupil centers, construct a pupil shape for each of the candidate pupil centers, and assign a confidence score for each of the shapes. Such a method may be repeated for different pupil centers, and the shape having a score satisfying a score criterion (e.g., the best score) is selected. Once the shape is selected, the corresponding center is selected as the adjusted pupil center 166 and the pupil radius 168 may be determined based on the selected shape and the adjusted pupil center 166. In some embodiments, the score for each iteration may reflect a log-likelihood of the examined parameter set (e.g., pupil radius and center), based on the known physical constraints and assumptions. In some embodiments, the physical constraints and assumptions may improve the efficiency of the MLE process by introducing better estimated initial conditions before iterating towards convergence. For example, some assumptions may include that: the pupil is circular (which when projected on a 2D plane is represented as ellipse/oval, pupil center is expected at the centroid of the circle, degree of similarity of orientation between left and right eye, stimulus-based assumption on the expected gaze point, and brightness of a display of the client device on which a video stimulus is shown to the user. In some embodiments, examples of physical constraints may include: pupil dilation dependence in overall brightness (light conditions), limited range of face orientation as users look at the display, blinking may initiate uncertainty due to readjustment time, or physical possible range of motion (both face and eyeball). Accordingly, the OPS 114 may obtain adjusted oculometric parameters, such as the adjusted eyelid data 164, adjusted pupil center 166 and the pupil radius 168 from the deconvolution process 194. In some embodiments, the above process 193 of processing iris data and the deconvolution process 194 may output the following oculometric parameters—adjusted eyelid data 164, adjusted pupil center 166 and the pupil radius 168, the iris rotation 158, iris translation 160 and iris radius 162 (also referred to as "a first set of oculometric parameters") in a first resolution. For example, the first resolution may be at a pixel level or other lower resolution.

In some embodiments, the OPS 114 may further improve the resolution of the first set of oculometric parameters. For example, the OPS 114 may improve the resolution from the first resolution to a second resolution (e.g., 0.1 mm, sub-pixel level or some other resolution that is greater, higher, or finer than the first resolution). In some embodiments, the OPS 114 may input the first set of oculometric parameters to an improve resolution process 195 to obtain a second set of oculometric parameters (e.g., oculometric parameters 170-178) at the second resolution. In some embodiments, the improve resolution process 195 may obtain the second set of oculometric parameters via a prediction model (e.g., based on the first set of oculometric parameters). As an example, the OPS 114 may input the first set of oculometric parameters obtained at the first resolution to the prediction model, which then outputs the second set of oculometric parameters at the second resolution. In some embodiments, the system 100 may train or configure a prediction model to facilitate the generation of the second set of oculometric parameters. In some embodiments, system 100 may obtain input data such as (a) a video stream having a video of the face of a user (e.g., video stream 125 or preprocessed video stream 151), (b) the first set of oculometric parameters (obtained at a first resolution as described above), (c) environment data such as lighting in the environment (e.g., a room) where the user is located, which can be measured using information obtained from the camera 120, (d) device data such as a display size, display resolution, display brightness, or display contrast associated with a display of the client device 106, model and manufacturer information of the camera 120, or (e) user information such as demographic, clinical history, optometric data, etc.

The system 100 may provide such input data to a prediction model to generate predictions (e.g., the second set of oculometric parameters such as iris rotation 170, iris translation 172, iris radius 174, pupil center 176, and pupil radius 178 at a second resolution). System 100 may provide reference feedback to the prediction model and the prediction model may update one or more portions of the prediction model based on the predictions and the reference feedback. As an example, where the prediction model generates predictions based on the above input data, a second set of oculometric parameters associated with such input data may be provided as reference feedback to the prediction model. As an example, a particular set of oculometric parameters obtained at the second resolution may be verified as an appropriate set of oculometric parameters (e.g., via user confirmation of the set of oculometric parameters, via one or more subsequent actions demonstrating such goal, etc.). The foregoing user input information may be provided as input to the prediction model to cause the prediction model to generate predictions of the second set of oculometric parameters, and the verified set of oculometric parameters may be provided as reference feedback to the prediction model to update the prediction model. In this way, for example, the prediction model may be trained or configured to generate more accurate predictions. In some embodiments, the reference feedback having the oculometric parameters at the second resolution may be obtained, determined, or derived from information obtained using any of several eye tracking devices that produce oculometric parameters at a high resolution (e.g., the second resolution). For example, some tracking devices produce oculometric parameters such as gaze origin, gaze point and pupil diameter at the second resolution. The OPS 114 may derive the second set of oculometric parameters such as the iris rotation, iris translation, iris radius, pupil center, and pupil radius from the oculometric parameters generated using the eye tracking device and provide the derived second set of oculometric parameters as reference feedback to train the prediction model. Such reference feedback may be obtained for several videos and provided as training dataset to train the prediction model.

In some embodiments, the foregoing operations for updating the prediction model may be performed with a training dataset with respect to one or more users (e.g., a training dataset associated with a given user to specifically train or configure the prediction model for the given user, a training dataset associated with a given cluster, demographic, or other group to specifically train or configure the prediction model for the given group, a training dataset associated with any given set of users, or other training dataset). As such, in some embodiments, subsequent to the updating of the prediction model, system 100 may use the prediction model to facilitate generation of a first set of oculometric parameters.

In some embodiments, the OPS 114 may also extract additional oculometric parameters such as a pupil visible fraction, a pupil coverage asymmetry, iris visible fraction, or iris coverage asymmetry. In some embodiments, the pupil visible fraction is calculated as the ratio between the pupil area not covered by the eyelids and the pupil iris area. The pupil coverage asymmetry may be defined as the mean of the pupil upper eyelid covered fraction and the pupil lower eyelid covered fraction when the upper eyelid covered fraction is represented in a positive value, and the lower eyelid covered fraction is represented in a negative value, normalized by the iris total covered area. The values of this parameter may vary between −1 and 1 and project the asymmetry between the eyelid coverage of the upper and the lower eyelids (e.g., "−1" may denote that all covered area is covered by the lower eyelid, "1" may denote that all covered area is covered by the upper eyelid, and "0" may denote that the upper and lower eyelids cover equal areas).

In some embodiments, the iris visible fraction is calculated as the ratio between the iris area not covered by the eyelids and the total iris area. In some embodiments, the iris coverage asymmetry may be determined as the mean of the iris upper eyelid covered fraction, and the iris lower eyelid covered fraction when the upper eyelid covered fraction is represented in a positive value, and the lower eyelid covered fraction is represented in a negative value, normalized by the iris total covered area. The values of this parameter vary between −1 and 1 and project the asymmetry between the eyelid coverage of the upper and the lower eyelids (e.g., '−1' all covered area is covered by the lower eyelid, '1'—all covered area is covered by the upper eyelid, and '0'-upper and lower eyelids cover equal areas).

The OPS 114 may extract the additional oculometric parameters based on the second set of oculometric parameters 170-178. For example, the OPS 114 may perform geometrical projections and calculations using the second set of oculometric parameters 170-178 to determine the additional oculometric parameters.

In some embodiments, the OPS 114 may also extract, generate, or derive the eye movement parameters that are indicative of eye movements responsive to a non-standard stimulus (e.g., a video or image displayed on the client device 106). In some embodiments, the OPS 114 may obtain eye movement parameters such as blink information, pupil response information, saccade information, anti-saccade information, fixation information, or smooth pursuit information. The blink information may include information that is descriptive of a blink of an eye. For example, the blink information may include blink presence data, which may be indicative of a presence or an absence of a blink of the eye at a particular instant. The blink presence data may be a time series data, which indicates the presence or absence of a blink at a particular instant for various times. In another example, the blink information may include a blink duration, which may be indicative of a time interval between a start and end of a detected eye blink. In yet another example, the blink information may include a blink frequency, which may be indicative of a mean blink number for a constant time interval, calculated when at least two blinks may be detected within the time series. The blink duration may be measured using a time unit such as seconds, and the blink frequency as a count per second. In some embodiments, the eye movement parameters are obtained for different time periods. For example, the blink duration and blink frequency may be obtained for a sequence in the video stimulus.

There may be various time intervals that are of significance in a video stimulus. In some embodiments, an event in the video stimulus is of a specified duration (e.g., a dot is shown in the display of the client device 106 for a random time between 1 and 3 seconds, or a dot moves around randomly for 1500 milliseconds). In some embodiments, a brick is a single run of a specific feature (e.g., saccade, fixation, smooth pursuit, or other such feature) and may include a collection of events in the video stimulus (e.g., a dot appears in the center, wait 1500 milliseconds, make the dot jump to left or right, wait 1000 milliseconds) moves around randomly for 1500 milliseconds). In some embodiments, a sequence corresponds to a collection of consecutive bricks of the same type of brick (e.g., 60 pro-saccade bricks). In some embodiments, the brick type may correspond to a specific feature (e.g., saccade, fixation, smooth pursuit, or other such feature). In some embodiments, a mixed sequence corresponds to a collection of consecutive bricks of the different brick type. In some embodiments, an act corresponds to a collection of consecutive sequences recorded for a user. In some embodiments, a session corresponds to a collection of acts.

In some embodiments, the pupil response information may be indicative of a response of the eye (e.g., pupil) to a particular stimulus. The pupil response information may include at least one of pupil response amplitude, pupil response rate, pupil response latency, or pupil response duration. The pupil response amplitude may be indicative of a maximal variance of pupil diameter for a time interval such as an event. The pupil response rate may be indicative of mean temporal rate of variance in the pupil diameter for the event. The pupil response latency may be indicative of a time interval between an event in the video stimulus and an initial change in pupil diameter. The pupil response duration may be indicative of a time interval between the initial change in the pupil diameter following the event and a stabilization of change in the size of the pupil diameter. In some embodiments, the pupil response information is obtained for an event in the video stimulus.

In some embodiments, the eye movement parameters include gaze parameters that are indicative of a direction the eyes are aimed or looking at. The OPS 114 may obtain different types of gaze parameters, such as fixation, saccade, anti-saccade, smooth pursuit, or another gaze parameter. In some embodiments, saccade is defined as the distribution of eye movements between inspection areas in the video stimulus. The saccade information may be indicative of a rapid movement of the eye in response to the video stimulus. The saccade information may include at least one of saccade latency, saccade amplitude, saccade peak velocity, saccade overshoot amplitude, or saccade correction time. The saccade latency may be indicative of a time between a stimulus event and detection of a saccadic movement of the eye. The saccade latency may be measured in seconds. The saccade amplitude may be indicative of an angular rotation that resulted in a saccadic movement of the eye. The saccade amplitude may be measured in degrees. The saccade peak velocity may be indicative of a maximal angular velocity measured during a saccadic movement. The saccade peak velocity may be measured in degrees per second. The saccade overshoot amplitude may be indicative of an angular variance between a target shown in the video stimulus and an actual gaze location at the end of an initial saccadic movement, before correcting (e.g., before correcting for the overshoot of the eye movement). The saccade overshoot amplitude may be measured in degrees. The saccade correction time may be indicative of a time interval between the end of the initial saccadic movement (e.g., at the overshoot stop) and gaze arrival time to the stimulus target. The saccade correction time may be measured in seconds. In some embodiments, the saccade information is obtained for an event in the video stimulus.

In some embodiments, anti-saccade information is indicative of a movement of the eye in a direction opposite to a side where a target is presented in the video stimulus. The anti-saccade information may include at least one of anti-saccade latency, anti-saccade amplitude, anti-saccade peak velocity, anti-saccade overshoot amplitude, or anti-saccade correction time. The anti-saccade latency may be indicative of a time between a stimulus event and detection of an anti-saccadic movement of the eye. The anti-saccade latency may be measured in seconds. The anti-saccade amplitude that is indicative of an angular rotation that resulted in an anti-saccadic movement of the eye. The anti-saccade amplitude may be measured in degrees. The anti-saccade peak velocity may be indicative of a maximal angular velocity measured during an anti-saccadic movement of the eye. The anti-saccade peak velocity may be measured in degrees per second. The anti-saccade overshoot amplitude may be indicative of an angular variance between a target shown in the video stimulus and an actual gaze location at the end of an initial saccadic movement, before correcting. The anti-saccade overshoot amplitude may be measured in degrees. The anti-saccade correction time may be indicative of a time between the end of the initial saccadic movement (e.g., at the overshoot stop) and gaze arrival time to the stimulus symmetric-tween target. The anti-saccade correction time may be measured in seconds. In some embodiments, the above anti-saccade information is obtained for an event in the video stimulus. Additionally, in some embodiments, the anti-saccade information may include anti-saccade direction confusion rate and anticipated anti-saccadic movement. The anti-saccade direction confusion rate may be indicative of the fraction of saccadic movements that are directionally reversed to the anti-saccadic target when more than two anti-saccadic stimuli are included in the time series data. The anticipated anti-saccadic movement may be indicative of a presence or absence of an anti-saccadic movement that begins before the stimulus is presented. The anticipated anti-saccadic movement may be obtained as a Boolean value. In some embodiments, the anti-saccade direction confusion rate and anticipated anti-saccadic movement may be measured for a sequence in the video stimulus.

In some embodiments, fixation is defined as the distribution of eye movements while inspecting a specific area of the stimulus. The fixation may be indicative of an ability of the eye to maintain a gaze on a single location in the video stimulus. The fixation information may include at least one of micro-saccade amplitude distribution, square wave jerk (SWJ) amplitude, SWJ frequency, or SWJ offset duration. The micro-saccade amplitude distribution may be indicative of a distribution of both angular and amplitude around a target in the video stimulus. The micro-saccade amplitude distribution may be calculated as a mean and standard deviation. In some embodiments, square wave jerks are involuntary, horizontal, saccadic intrusions that interrupt fixation. Each SWJ consists of an initial saccade that moves the fovea away from the intended position of fixation, followed by a second saccade in the opposite direction, which refoveates the fixation position. The SWJ amplitude may be indicative of the mean amplitude of the SWJs. The SWJ amplitude may be measured in degrees. The SWJ frequency may be indicative of a mean wave frequency. The SWJ offset duration may be indicative of a mean time interval spent off the target in the video stimulus. The SWJ offset duration may be measured in seconds. In some embodiments, the fixation information may be obtained from a brick in the video stimulus.

In some embodiments, smooth pursuit is defined as the distribution of eye movements while following movement. The smooth pursuit may be indicative of a type of eye movement (e.g., smooth, and gradual movement as opposed to rapid movement in saccade) in which the eyes remain fixated on a moving object in the video stimulus. The smooth pursuit information may include at least one of (a) a classification of the eye movement type, (b) saccadic movement amplitude percentage, (c) smooth movement amplitude percentage, (d) saccadic movement temporal percentage, (e) fixation temporal percentage, or (f) smooth movement temporal percentage. The movement type classification may include classification of the eye movements in an entire act of the video stimulus into saccadic movement, smooth movement, and fixation movement types. The saccadic movement temporal percentage may be indicative of the time fraction of saccadic movements for an act in the video stimulus. The fixation temporal percentage may be indicative of the time fraction of fixation for an act in the video stimulus. The smooth movement temporal percentage may be indicative of the time fraction of smooth movements for an act in the video stimulus. The saccadic movement amplitude fraction or percentage may be indicative of the amplitude fraction of saccadic movements for an act in the video stimulus. The smooth movement amplitude fraction or percentage may be indicative of the amplitude fraction of smooth movements for an act in the video stimulus.

The OPS 114 may obtain the above eye movement parameters based on high resolution oculometric parameters such as eye openness data, eye size data and eye tracking data. The details of obtaining the eye movement parameters are described at least with reference to FIG. 6.

Figure 6:
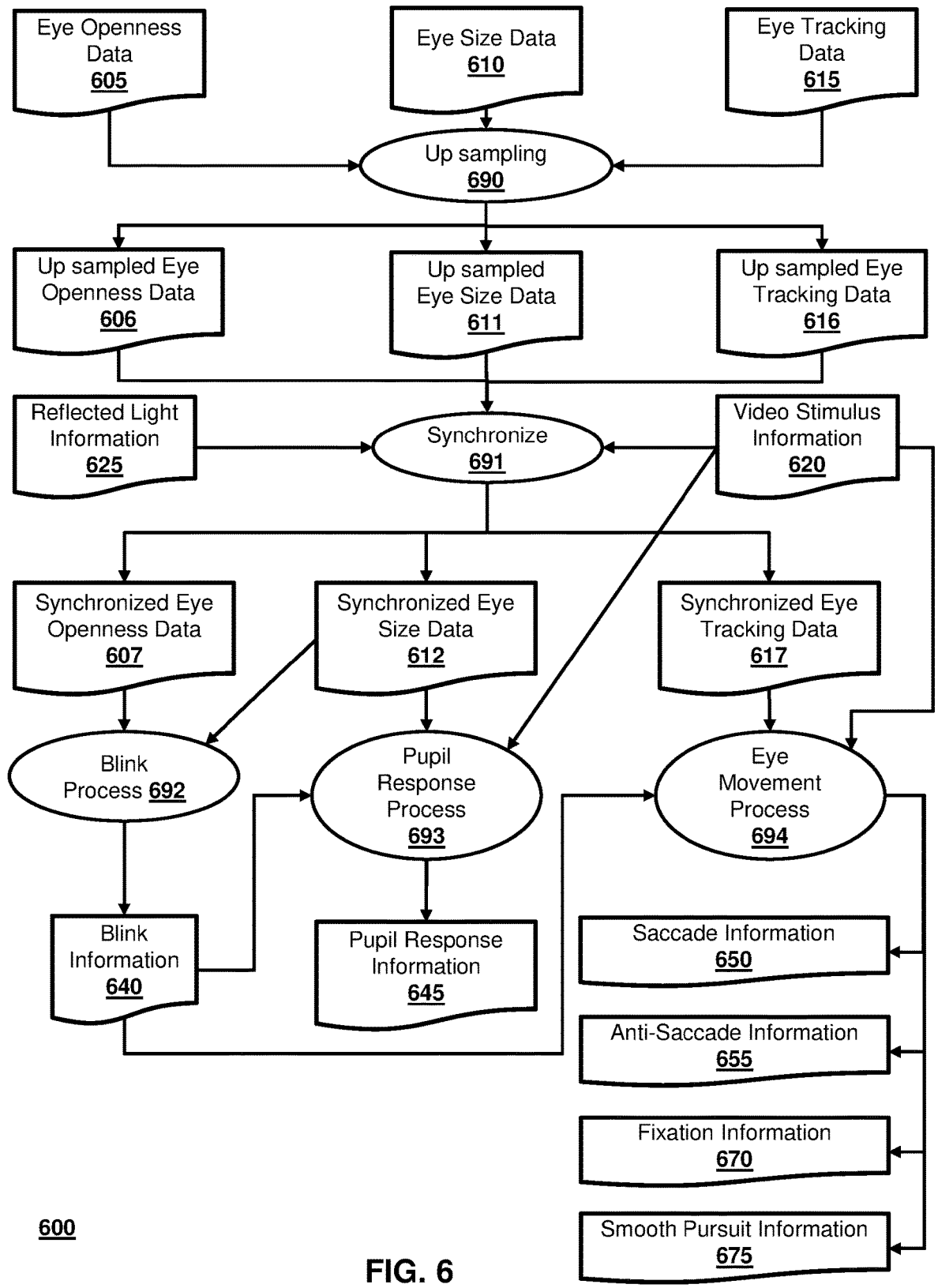
FIG. 6 is a flow diagram of a process for obtaining high resolution eye movement parameters, consistent with various embodiments.

FIG. 6 is a flow diagram of a process 600 for obtaining high resolution eye movement parameters, consistent with various embodiments. The OPS 114 may obtain high resolution oculometric parameters, such as eye openness data 605, eye size data 610 and eye tracking data 615. In some embodiments, the eye openness data 605 includes at least one of a pupil visible fraction, a pupil coverage asymmetry, iris visible fraction, or iris coverage asymmetry. In some embodiments, the eye size data 610 includes at least one of iris radius (e.g., iris radius 174) or pupil radius (e.g., pupil radius 178). In some embodiments, the eye tracking data 615 includes at least one of pupil location (e.g., pupil center 176), iris translation (e.g., iris translation 172), or iris rotation (e.g., iris rotation 170). In some embodiments, the eye openness data 605, eye size data 610 and eye tracking data 615 are obtained in a high resolution (e.g., at a sub-pixel level, 0.1 mm, or other greater, higher, finer resolution) and as time series data (e.g., as the second set of oculometric parameters and additional set of oculometric parameters described above at least with reference to FIG. 1B and FIG. 4). Further, the oculometric parameters (e.g., the eye openness data 605, eye size data 610 and eye tracking data 615) may be obtained at a first temporal resolution (e.g., 30 frames per second (fps)).

The OPS 114 may perform an up-sampling process 690 to increase the temporal resolution of the oculometric parameters to a second temporal resolution (e.g., to 45 fps, 50 fps, 60 fps, or other temporal resolution greater, higher, or finer than the first temporal resolution). For example, the OPS 114 may up sample a time series of the eye openness data 605, eye size data 610 and eye tracking data 615 from 30 fps to 50 fps to generate a time series of up sampled eye openness data 606, up sampled eye size data 611 and up sampled eye tracking data 616, respectively, at 50 fps. In some embodiments, the OPS 114 up samples the oculometric parameters to improve the accuracy of the eye movement parameters that may be derived using the oculometric parameters. In some embodiments, the OPS 114 implements a prediction model to up sample the oculometric parameters to a second temporal resolution greater, higher, or finer than the first temporal resolution. As an example, the OPS 114 may input the oculometric parameters (e.g., the eye openness data 605, eye size data 610 and eye tracking data 615) to the prediction model, which then outputs up sampled oculometric parameters, such as up sampled eye openness data 606, up sampled eye size data 611 and up sampled eye tracking data 616, at the second temporal resolution. In some embodiments, the system 100 may train or configure a prediction model to facilitate the generation of the up sampled oculometric parameters. In some embodiments, system 100 may obtain the oculometric parameters at the first temporal resolution (e.g., eye openness data 605, eye size data 610 and eye tracking data 615) and provide such information as input to a prediction model to generate predictions (e.g., up sampled eye openness data 606, up sampled eye size data 611 and up sampled eye tracking data 616, etc.) at a second temporal resolution. System 100 may provide reference feedback to the prediction model and the prediction model may update one or more portions of the prediction model based on the predictions and the reference feedback. As an example, where the prediction model generates predictions based on a set of oculometric parameters at the first temporal resolution, a set of oculometric parameters (e.g., associated with such input oculometric parameters) obtained at the second temporal resolution may be provided as reference feedback to the prediction model. As an example, a particular set of oculometric parameters at the second temporal resolution may be verified as an appropriate set of up sampled oculometric parameters (e.g., via user confirmation of the up sampled set of oculometric parameters, via one or more subsequent actions demonstrating such goal, etc.). The foregoing input oculometric parameters may be provided as input to the prediction model to cause the prediction model to generate predictions of the up sampled oculometric parameters, and the verified set of up sampled oculometric parameters may be provided as reference feedback to the prediction model to update the prediction model. In this way, for example, the prediction model may be trained or configured to generate more accurate predictions. In some embodiments, a training dataset used to train the prediction model to generate predictions of up sampled oculometric parameters may include several data items in which each data item includes at least a set of oculometric parameters at a first temporal resolution and a corresponding set of oculometric parameters obtained at a second temporal resolution as the ground truth.

In some embodiments, the foregoing operations for updating the prediction model may be performed with a training dataset with respect to one or more users (e.g., a training dataset associated with a given user to specifically train or configure the prediction model for the given user, a training dataset associated with a given cluster, demographic, or other group to specifically train or configure the prediction model for the given group, a training dataset associated with any given set of users, or other training dataset). As such, in some embodiments, subsequent to the updating of the prediction model, system 100 may use the prediction model to facilitate generation of up sampled oculometric parameters.

While the foregoing paragraphs describes the OPS 114 implementing a prediction model to up sample the oculometric parameters, the OPS 114 may use other methods instead of, or in addition to, the prediction model to up sample the oculometric parameters. For example, the OPS 114 may use interpolation methods to retrieve the oculometric parameters in a second temporal resolution based on a first temporal resolution (e.g., wherein the second resolution is greater, finer, or higher than the first temporal resolution).

The OPS 114 may perform a synchronization process 691 to synchronize the oculometric parameters with the video stimulus presented on the display of the client device 106. As described above, the set of oculometric parameters (e.g., the eye openness data 605, eye size data 610 and eye tracking data 615, or the up sampled eye openness data 606, up sampled eye size data 611 and up sampled eye tracking data 616) is a time series data. That is, a series of values of an oculometric parameter is obtained at various times (e.g., successive times). To ensure the time at which the value of an oculometric parameter is measured corresponds to a time of the corresponding event in the video stimulus, the OPS 114 may perform the synchronization process 691 to synchronize the time series of the oculometric parameters. For example, consider that an event, such as a dot starts moving from a specific location in the video stimulus at a time t in the video stimulus, but the oculometric parameter corresponding to the eye movement (e.g., eye tracking data 615 or up sampled eye tracking data 616) measured using video stream captured from the camera 120 of the client device 106 is recorded at t+x milliseconds, then there is a lag of x milliseconds, which may cause inaccuracy in determining some of the eye movement parameters. By synchronizing the oculometric parameters with the video stimulus, the time component of the oculometric parameter is shifted by x milliseconds (e.g., t−x) to compensate the lag of x milliseconds. Accordingly, in some embodiments, synchronizing the oculometric parameters with the video stimulus may result in an improved accuracy in determining the eye movement parameters.

The OPS 114 may perform the synchronization process 691 in one of several ways. For example, the OPS 114 may perform the synchronization process 691 based on light modulation. In some embodiments, the OPS 114 may provide video stimulus information 620 and reflected light information 625 as input to the synchronization process 691, which synchronizes the oculometric parameters (e.g., the eye openness data 605, eye size data 610 and eye tracking data 615, or the up sampled eye openness data 606, up sampled eye size data 611 and up sampled eye tracking data 616) based on the video stimulus information 620 and reflected light information 625 to generate synchronized oculometric parameters (e.g., synchronized eye openness data 607, synchronized eye size data 612 and synchronized eye tracking data 617). For example, the OPS 114 synchronizes a time series of the up sampled eye openness data 606, up sampled eye size data 611 and up sampled eye tracking data 616 based on the video stimulus information 620 and the reflected light information 625 to generate a time series of the synchronized eye openness data 607, synchronized eye size data 612 and synchronized eye tracking data 617, respectively.

The video stimulus information 620 may include stimulus brightness and color modulation pattern (e.g., a two-dimensional array of red, green, blue (RGB) intensity values of various pixels (e.g., all pixels) of the video stimulus for various times), which may be used as a synchronization signal for synchronizing the oculometric parameters. The video stimulus information 620 may also include at least one of information that is descriptive of the graphical features of the video stimulus (e.g., background of video stimulus, brightness, contrast, or color component values), or information regarding a stimulus type (e.g., which is designated for a specific feature such as saccade, fixation, or smooth pursuit) that is presented on the display of the client device 106. In some embodiments, the synchronization signal is determined based on the graphical features of the video stimulus and the stimulus type. The reflected light information 625 may be indicative of mean reflected light from a target in the environment in which the user is located (e.g., light reflected from a face of the user 140, from an object in a room in which the user 140 is located, etc.) The mean reflected light may be measured by processing the video stream captured using the camera 120 and may be measured as two-dimensional array of RGB intensity values. In some embodiments, the synchronization process 691 may consider a trend of the light modulation, e.g., a change in the reflected light or a change in the RGB intensity values of the video stimulus, for synchronizing the oculometric parameters.

The OPS 114 may process the synchronized oculometric parameters to obtain various eye movement parameters. For example, the OPS 114 may perform a blink process 692 to obtain blink information 640. In some embodiments, the blink information includes blink presence data, which may be indicative of a presence or absence of a blink at a particular moment in time. In some embodiments, the blink presence data is a Boolean array in which the Boolean value indicates a presence or absence of a blink at a particular moment in time. The blink presence data may be a time series of the Boolean value. Further, the blink process 692 may process (e.g., time series analysis) the blink presence data to determine at least one of blink duration or blink frequency as part of the blink information 640. The blink process 692 may generate the blink information 640 based on the synchronized eye openness data 607 and synchronized eye size data 612.

The OPS 114 may perform a pupil response process 693 to obtain pupil response information 645, which may be indicative of a response of the pupil to the video stimulus. The pupil response information 645 may include least one of pupil response amplitude, pupil response rate, pupil response latency, or pupil response duration. The pupil response process 693 may generate the pupil response information 645 based on at least one of the blink information 640, the synchronized eye size data 612 and the video stimulus information 620 such as, designated stimulus type for a feature. In some embodiments, the designated stimulus type may be used to obtain information such as physical and temporal dimensions of a brick, color, brightness, etc. of the video stimulus that may be used by the pupil response process 693 in obtaining the pupil response information 645.

The OPS 114 may perform eye movement process 694 to obtain various eye movement parameters, such as saccade information 650, anti-saccade information 655, fixation information 670 or smooth pursuit information 675. The saccade information 650 may include at least one of saccade latency, saccade amplitude, saccade peak velocity, saccade overshoot amplitude, or saccade correction time. The anti-saccade information 655 may include at least one of anti-saccade latency, anti-saccade amplitude, anti-saccade peak velocity, anti-saccade overshoot amplitude, or anti-saccade correction time. The fixation information 670 may include at least one of micro-saccade amplitude distribution, SWJ amplitude, SWJ frequency, or SWJ offset duration. The smooth pursuit information 675 may include at least one of a classification of the eye movements, saccadic movement amplitude percentage, smooth movement amplitude percentage, saccadic movement temporal percentage, fixation temporal percentage, or smooth movement temporal percentage.

The OPS 114 may obtain the above eye movement parameters for both the eyes of the users. Further, the OPS 114 may derive additional eye movement parameters based on the above eye movement parameters. For example, the OPS 114 may analyze the above eye movement parameters and generate separate eye movement parameters for vertical and horizontal eye movements (e.g., in respect to the user's eyes). In another example, the OPS 114 may derive eye movement parameters that are calculated based on both eyes (e.g., movement lag between the eyes, latency differences between the eyes, etc.). In some embodiments, one or more of the above eye movement parameters (e.g., including the additional eye parameters) may be used in generating various digital biomarkers.

Referring to FIG. 1A, in some embodiments, the marker subsystem 116 may produce digital biomarkers (e.g., parameters) that may act as an indicator of one or more neurological disorders. The marker subsystem 116 may produce the digital biomarkers based on based on the oculometric parameters or the eye movement parameters (e.g., discussed above). In some embodiments, these digital biomarkers are tightly correlated (and can therefore serve as proxies) for disease progression or acuity. The digital biomarkers generated by the marker subsystem 116 may be objective, sensitive, accurate (e.g., 0.1 mm or less), or correlated with clinical progression of diseases, and may be obtained remotely, outside of lab settings and even in a distributed manner.

Note that the oculometric parameters, the eye movement parameters, or the digital biomarkers may be obtained in real-time (e.g., based on a real-time video stream obtained from the camera 120) or offline (e.g., using a video stored in the database 132). Further, the oculometric parameters (e.g., second set of oculometric parameters 170-178 or other oculometric parameters) are obtained as time-series data and for one or more eyes of the user. That is, the oculometric parameters 170-178 may be extracted continuously at a specified time interval (e.g., every millisecond, every few milliseconds, or other temporal resolution).

In some embodiments, the prediction models described above may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
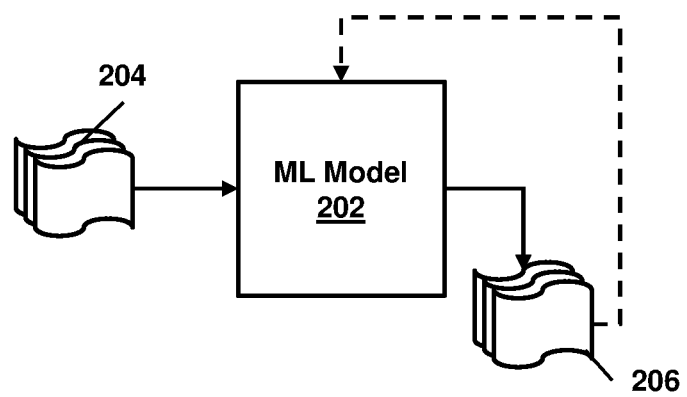
FIG. 2 shows a machine learning model configured to facilitate prediction of oculometric parameters, in accordance with one or more embodiments.

A neural network may be trained (i.e., whose parameters are determined) using a set of training data (e.g., ground truths). The training data may include a set of training samples. Each sample may be a pair comprising an input object (typically an image, a measurement, a tensor or vector which may be called a feature tensor or vector) and a desired output value (also called the supervisory signal). A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots (x_N, y_N)\}$ such that $x_i$ is the feature tensor/vector of the i-th example and $y_i$ is its supervisory signal, a training algorithm seeks a neural network g: X→Y, where X is the input space and Y is the output space. A feature tensor/vector is an n-dimensional tensor/vector of numerical features that represent some object (e.g., a complex electric field image). The tensor/vector space associated with these vectors is often called the feature or latent space. After training, the neural network may be used for making predictions using new samples. As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Figure 4:
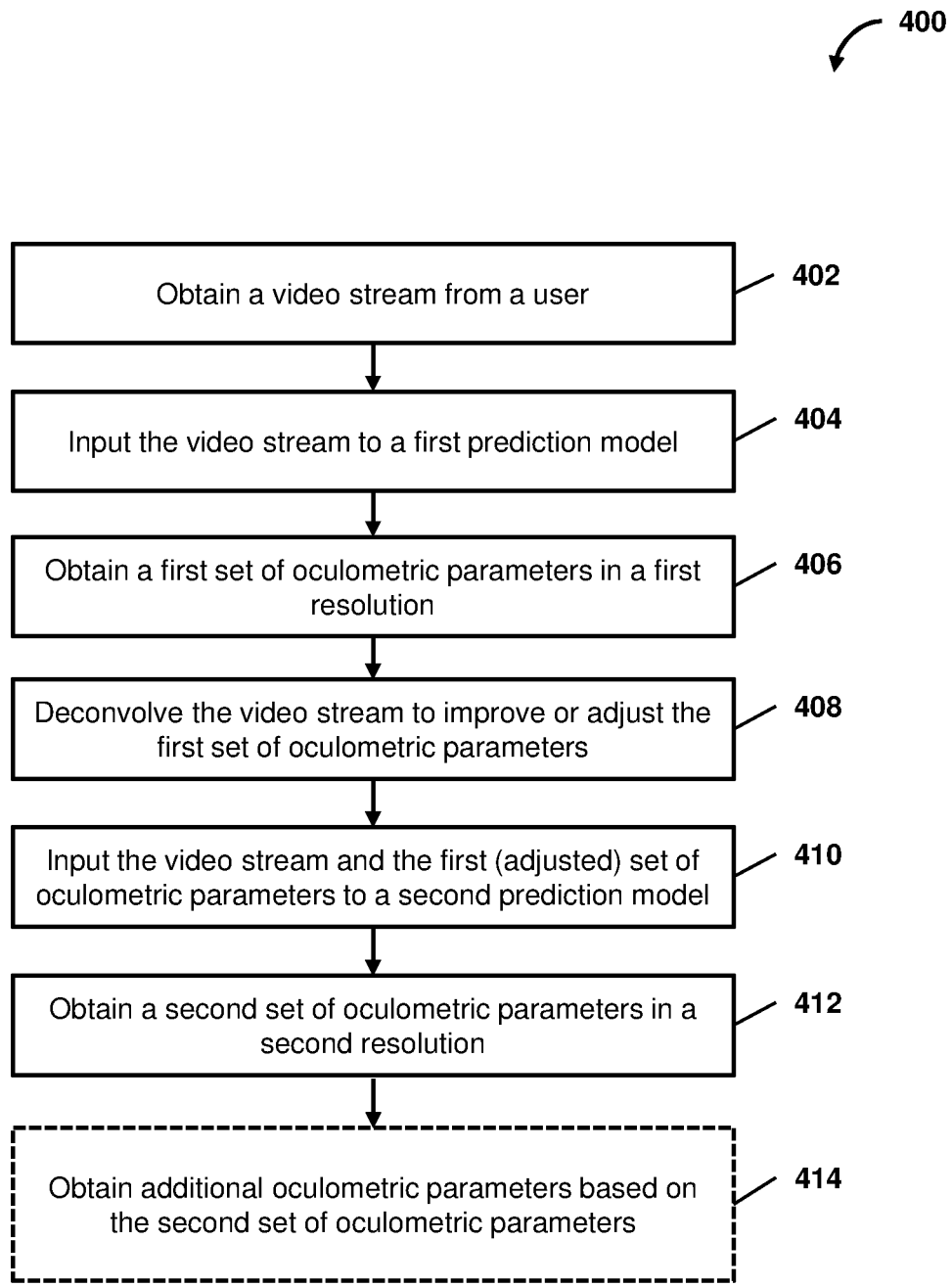
FIG. 4 is a flow diagram of a process for obtaining oculometric parameters at a high resolution, consistent with various embodiments.

FIG. 4 is a flow diagram of a process 400 for obtaining oculometric parameters at a high resolution, consistent with various embodiments. In some embodiments, the process 400 may be executed in the system 100 of FIG. 1A.

In an operation 402, a video stream is obtained from a client device associated with a user. The video stream may include a video of a face of the user. For example, the video stream 125 is obtained from the client device 106. In some embodiments, the video stream may be obtained a real-time video stream (e.g., captured by a camera associated with the client device such as the camera 120 of the client device 106), or may be a recorded video that is obtained from a data storage device (e.g., database 132), data storage or a memory on the client device, or other data storage devices.

In an operation 404, the video stream is input to a first prediction model to obtain a first set of oculometric parameters. In some embodiments, the video stream may pre-processed prior to being input to the first prediction model. In some embodiments, preprocessing the video stream may include performing an ETL process on the video stream to adjust color and brightness (e.g., white balance) in the video stream, reduce noise from the video stream, improve resolution of the video stream by implementing one or more multi-frame super-resolution techniques, or other such video processing. For example, the video stream input to the first prediction model may be the video stream 125 or the preprocessed video stream 151.

In an operation 406, the first set of oculometric parameters are obtained from the first prediction model. The oculometric parameters correspond to various characteristics of an eye. For example, the first set of oculometric parameters may include iris data, eyelid data and pupil center. The iris data may include coordinates of several points that describe a center and a shape (e.g., an ellipse) of the iris. The eyelid data may include coordinates of an array of points that describe a shape (e.g., a polygon) representing the eyelids. The pupil center may include a coordinate of a point representing the center of the pupil. In some embodiments, the first set of oculometric parameters are obtained at a first resolution. For example, the first resolution may be at a pixel level or other lower resolution. In some embodiments, the iris data is further processed to obtain iris rotation, iris translation and iris radius from the iris data. For example, the iris data 153 is processed to obtain the iris rotation 158, iris translation 160 and iris radius 162. The iris rotation may be representative of a rotation of the iris and may be retrieved as the iris normal vector (e.g., perpendicular to the iris circle plain). The iris translation may be a center of the iris and may be represented using coordinates that identify a location of the iris center. The iris radius may be a radius of the iris and may be represented as a scalar with distance units. In some embodiments, an MLE-based curve fitting method may be performed to estimate the iris related parameters. The iris data is provided as input to the MLE-based curve fitting method (e.g., oval fit), which generates the above iris related parameters.

In an operation 408, the video stream is deconvolved to adjust (e.g., improve accuracy or resolution) the first set of oculometric parameters. The video stream input to the deconvolution process may be the video stream 125 or the preprocessed video stream 151. In some embodiments, the video stream is deconvolved by using a blind deconvolution process integrated with an MLE process, the additional details of which are described above at least with reference to FIGS. 1A and 1B and below at least with reference to FIG. 5. In some embodiments, applying blind deconvolution algorithm may help in decreasing or removing the blurring in the images/video, or any other noise from the video stream to improve the accuracy of the oculometric parameters extracted. The deconvolution process may be repeated one or more times to obtain the adjusted oculometric parameters (e.g., whose accuracy or resolution is improved compared to the oculometric parameters prior to the deconvolution process). The adjusted parameters may include adjusted eyelid data, adjusted pupil center and pupil radius.

In an operation 410, the video stream and the first set of parameters are input to a second prediction model to obtain the oculometric parameters at a high resolution. For example, the first set of oculometric parameters, including the iris rotation 158, iris translation 160, the iris radius 162, the adjusted eyelid data 164, adjusted pupil center 166 and pupil radius 168, etc. are input to the second prediction model. In some embodiments, the second prediction model is trained to predict the set of oculometric parameters at a high resolution. For example, the second prediction model is trained with several training datasets in which each dataset includes a video of the face of the user, device data of the client device, environment data of an environment in which the user is located and user information of the user as input data, and the corresponding set of oculometric parameters at a high resolution as the ground truth. In some embodiments, the set of oculometric parameters at the high resolution is obtained using one or more eye tracking devices that are configured to produce the oculometric parameters at a high resolution.

In an operation 412, a second set of oculometric parameters are obtained at a second resolution from the second prediction model. For example, the second set of oculometric parameters including iris rotation 170, iris translation 172, iris radius 174, pupil center 176, and pupil radius 178 are obtained at a second resolution (e.g., 0.1 mm, sub-pixel level or some other resolution greater, higher, or finer than the first resolution).

Optionally, in an operation 414, additional set of oculometric parameters may be obtained. For example, additional oculometric parameters such as a pupil visible fraction, a pupil coverage asymmetry, iris visible fraction, or iris coverage asymmetry may be obtained based on the second set of oculometric parameters. The OPS 114 may obtain the addition oculometric parameters by performing geometrical projections and calculations using the second set of oculometric parameters. In some embodiments, the pupil visible fraction is calculated as the ratio between the pupil area not covered by the eyelids and the pupil iris area. The pupil coverage asymmetry may be defined as the mean of the pupil upper eyelid covered fraction and the pupil lower eyelid covered fraction when the upper eyelid covered fraction is represented in a positive value, and the lower eyelid covered fraction is represented in a negative value, normalized by the iris total covered area. The values of this parameter may vary between −1 and 1 and project the asymmetry between the eyelid coverage of the upper and the lower eyelids (e.g., "−1" may denote that all covered area is covered by the lower eyelid, "1" may denote that all covered area is covered by the upper eyelid, and "0" may denote that the upper and lower eyelids cover equal areas.

Operations 402-414 may be performed by a subsystem that is the same as or similar to OPS 114, in accordance with one or more embodiments.

Figure 5:
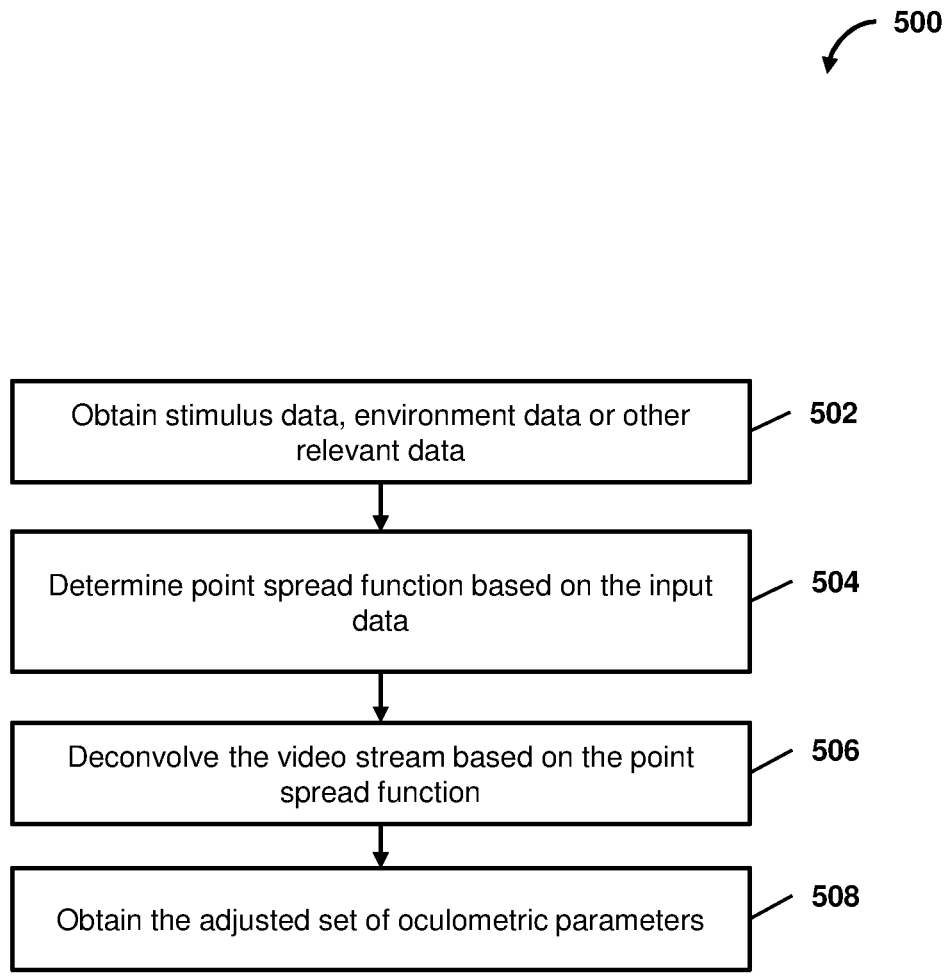
FIG. 5 is a flow diagram of a process for deconvolving a video stream to obtain adjusted oculometric parameters, consistent with various embodiments.

FIG. 5 is a flow diagram of a process 500 for deconvolving a video stream to obtain adjusted oculometric parameters, consistent with various embodiments. In some embodiments, the process 500 may be performed as part of operation 408 of process 400.

In an operation 502, input data such as the video stream, stimulus data, environment data, device data or other data is obtained to perform deconvolution of the video stream. The video stream input to the deconvolution process may be the video stream 125 or the preprocessed video stream 151. The stimulus data may include spatio-temporal information on a stimulus presented on the display of the client device 106, or optical properties information on the of the stimulus, including spectral properties (e.g., color) and intensity (e.g., brightness). The environment data may include information such as lighting in the environment (e.g., a room) in which the user is located, which can be measured using information obtained from the camera 120. The device data may include information such as orientation information of the client device 106, information from one or more sensors associated with the client device 106 such as acceleration sensors. Further, the input data may also include eyelid data (e.g., eyelid data 155) and the pupil center (e.g., pupil center 157).

In an operation 504, a point spread function of the blind deconvolution algorithm is determined based on the input data.

In an operation 506, the video stream is deconvolved based on the point spread function. The deconvolution process removes or reduces any blurring, or any other noise introduced into the video stream due to user environment related factors, client device related factors, camera related factors, video stimulus related factors etc. to improve the video stream and therefore, improve the accuracy of the oculometric parameters retrieved.

In an operation 508, the adjusted oculometric parameters are derived from the deconvolved video stream as described above. For example, the adjusted oculometric parameters may include adjusted eyelid data 164, adjusted pupil center 166 or pupil radius 168. In some embodiments, the deconvolution process is integrated with an MLE process to further improve the accuracy of the oculometric parameters. For example, the MLE process may be used to improve the accuracy of the eyelid data 155. The MLE process may be used to perform a parabolic curve fitting operation on the eyelid data 155 to obtain a more accurate representation of the eyelids, as adjusted eyelid data 164. In another example, the MLE process may be used to obtain or improve the accuracy of pupil related data, such as pupil radius 168. The MLE process may be used to perform a curve fitting operation (e.g., oval fit) to improve a shape of the pupil. For example, the MLE process may consider different pupil centers, and may construct a pupil shape for each of the candidate pupil centers and assign a confidence score for each of the shapes. Such a method may be repeated for different pupil centers, and the shape having a score satisfying a score criterion (e.g., the best score) is selected. Once the shape is selected, the corresponding center may be selected as the adjusted pupil center 166 and the pupil radius 168 may be determined based on the selected shape and the adjusted pupil center 166.

In some embodiments, the process 500 may be repeated one or more times (e.g., until the accuracy or resolution of the oculometric parameters satisfy a criterion (e.g., exceed a threshold value) or the PSF satisfies a criterion) to improve the accuracy or resolution of the adjusted oculometric parameters.

Figure 7:
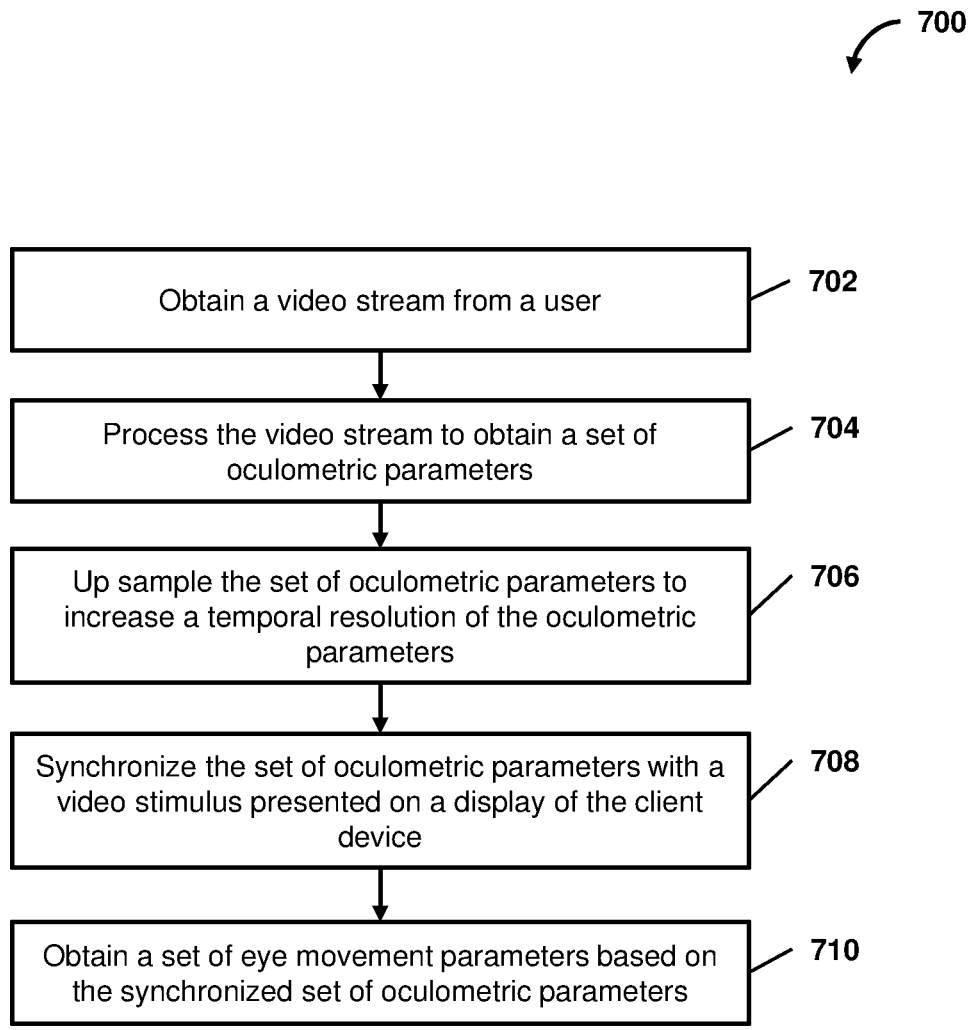
FIG. 7 is a flow diagram of another process for obtaining high resolution eye movement parameters from a video stream, consistent with various embodiments.

FIG. 7 is a flow diagram of a process 700 for obtaining high resolution eye movement parameters from a video stream, consistent with various embodiments. In some embodiments, the process 700 may be executed in the system 100 of FIG. 1A.

In an operation 702, a video stream is obtained from a client device associated with a user. The video stream may include a video of a face of the user. For example, the video stream 125 is obtained from the client device 106. In some embodiments, the video stream may be a real-time video stream (e.g., captured by a camera associated with the client device such as the camera 120 of the client device 106), or may be a recorded video that is obtained from a data storage device (e.g., database 132), data storage or a memory on the client device, or other data storage devices.

In an operation 704, the video stream is processed to obtain a set of oculometric parameters. The set of oculometric parameters may include at least one of eye openness data, eye size data and eye tracking data. For example, the eye openness data 605, the eye size data 610, and eye tracking data 615 are obtained from the video stream. In some embodiments, the eye openness data 605, which is indicative of an extent to which the eye is open or closed, may include at least one of a pupil visible fraction, a pupil coverage asymmetry, iris visible fraction, or iris coverage asymmetry. In some embodiments, the eye size data 610, which is indicative of the size of a pupil or iris, includes at least one of iris radius (e.g., iris radius 174) or pupil radius (e.g., pupil radius 178). In some embodiments, the eye tracking data 615, which is indicative of a gaze or a location where the eye is focused at, includes at least one of pupil location (e.g., pupil center 176), iris translation (e.g., iris translation 172), or iris rotation (e.g., iris rotation 170). In some embodiments, the eye openness data 605, eye size data 610 and eye tracking data 615 are obtained in a high resolution and as time series data (e.g., as the second set of oculometric parameters and additional set of oculometric parameters described above at least with reference to FIG. 1B and FIG. 4). Further, the set of oculometric parameters (e.g., the eye openness data 605, eye size data 610 and eye tracking data 615) may be obtained at a first temporal resolution (e.g., 30 fps).

In an operation 706, the set of oculometric parameters are up sampled to increase a temporal resolution. For example, a time series of the eye openness data 605, eye size data 610 and eye tracking data 615 are up sampled from a first temporal resolution of 30 fps to a second temporal resolution of 50 fps to generate a time series of up sampled eye openness data 606, up sampled eye size data 611 and up sampled eye tracking data 616, respectively at 50 fps. In some embodiments, the up sampling may be performed using a prediction model that is trained to generate oculometric parameters at a second temporal resolution. For example, a set of oculometric parameters (e.g., the eye openness data 605, eye size data 610 and eye tracking data 615) at the first temporal resolution are input to the prediction model, which generates a prediction of the set of oculometric parameters at the second temporal resolution (up sampled eye openness data 606, up sampled eye size data 611 and up sampled eye tracking data 616). In some embodiments, the set of oculometric parameters may also be up sampled using other methods, e.g., interpolation.

In an operation 708, the set of oculometric parameters are synchronized with the video stimulus presented on the display of the client device 106. The set of oculometric parameters may be synchronized based on video stimulus information (e.g., video stimulus information 620), which is indicative of the video stimulus presented on the display of the client device 106 and the reflected light information (e.g., reflected light information 625), which may be indicative of light reflected from a target in the environment of the user. For example, the oculometric parameters (e.g., the eye openness data 605, eye size data 610 and eye tracking data 615, or the up sampled eye openness data 606, up sampled eye size data 611 and up sampled eye tracking data 616) are synchronized based on the video stimulus information and the reflected information to generate a synchronized set of oculometric parameters (e.g., synchronized eye openness data 607, synchronized eye size data 612 and synchronized eye tracking data 617). In some embodiments, synchronizing the oculometric parameters with the video stimulus may result in an improved accuracy in determining the eye movement parameters.

In an operation 710, a set of eye movement parameters are generated based on the synchronized set of oculometric parameters. For example, the synchronized set of oculometric parameters are processed to generate eye movement parameters, such as blink information (e.g., blink information 640), pupil response information (e.g., pupil response information 645), saccade information (e.g., saccade information 650), anti-saccade information (e.g., anti-saccade information 655), fixation information (e.g., fixation information 670), or smooth pursuit information (e.g., smooth pursuit information 675). As described above, the blink information may include at least one of blink presence data, blink duration or blink frequency. The saccade information may include at least one of saccade latency, saccade amplitude, saccade peak velocity, saccade overshoot amplitude, or saccade correction time. The anti-saccade information may include at least one of anti-saccade latency, anti-saccade amplitude, anti-saccade peak velocity, anti-saccade overshoot amplitude, or anti-saccade correction time. The fixation information may include at least one of micro-saccade amplitude distribution, SWJ amplitude, SWJ frequency, or SWJ offset duration. The smooth pursuit information may include at least one of a classification of the eye movements, saccadic movement amplitude percentage, smooth movement amplitude percentage, saccadic movement temporal percentage, fixation temporal percentage, or smooth movement temporal percentage. Additional details regarding obtaining the eye movement parameters are described at least with reference to FIGS. 8-11 below.

Figure 8:
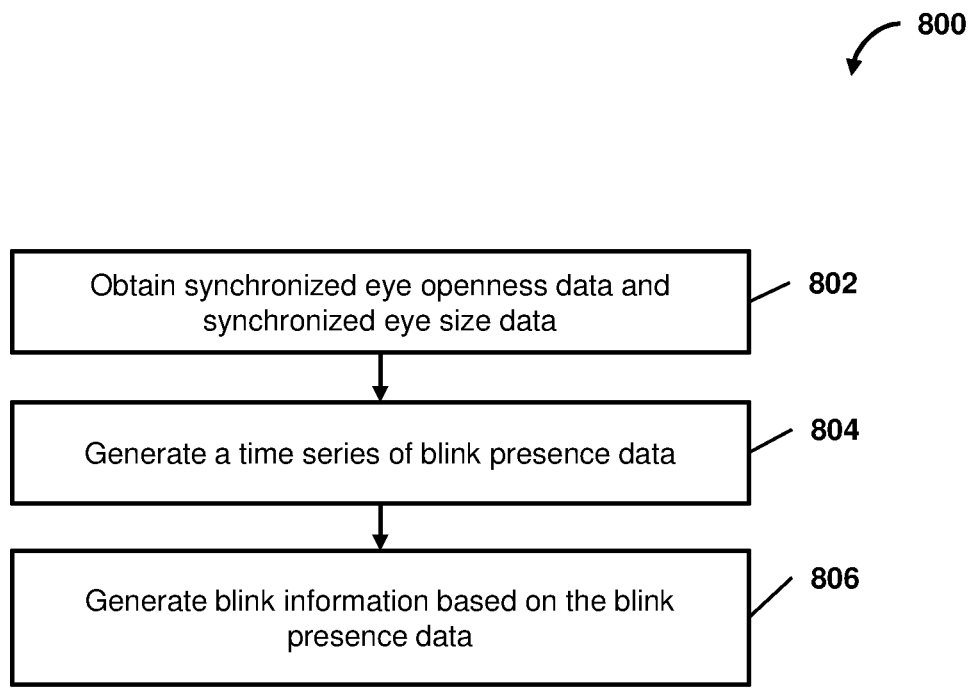
FIG. 8 is a flow diagram of a process for obtaining blink information, consistent with various embodiments.

FIG. 8 is a flow diagram of a process 800 for obtaining blink information, consistent with various embodiments. In some embodiments, the process 800 may be similar to the blink process 692 of the process 600 of FIG. 6. The process 800 may be implemented as part of operation 710 of process 700 of FIG. 7.

In an operation 802, eye openness data and eye size data are obtained. For example, synchronized eye openness data 607 and synchronized eye size data 612 are obtained. In some embodiments, the eye openness data may include at least one of a pupil visible fraction, a pupil coverage asymmetry, iris visible fraction, or iris coverage asymmetry all of which are indicative of an extent to which the eye is open or closed. In some embodiments, the eye size data includes at least one of iris radius (e.g., iris radius 174) or pupil radius (e.g., pupil radius 178), which are indicative of the size of a pupil or iris. In some embodiments, the eye openness data and eye size data are obtained as time series data.

In an operation 804, blink presence data, which indicates a presence or absence of a blink is generated. In some embodiments, the blink presence data is generated as a time series which indicates whether a blink of an eye is detected at a particular instant in time for various time values. The time series of eye openness data and eye size data are analyzed to determine whether a blink of an eye is detected at a particular instant. In some embodiments, a blink is detected when a blink criterion is satisfied, and a blink is not detected when the blink criterion is not satisfied. Various methods may be used to determine whether a blink is detected. For example, a blink criterion may be satisfied when a threshold percentage (e.g., 20%, 25%, 30%, 40%, or other percentage) of the iris or pupil is covered (which may be determined using the eye openness data and eye size data at the particular instant). In some embodiments, the blink presence data may be an array of Boolean values indicating a presence or absence of a blink. Further, the blink presence data may be generated per brick of the video stimulus and may be generated for each eye separately. For example, blink presence data may be generated as follows:

$$\text{BLINK}(t) = \begin{cases} 1, & EOD(t) < \tau_{blink} \\ 0, & EOD(t) \geq \tau_{blink} \end{cases} \quad \text{Eq. (1)}$$

Where BLINK(t) is a Boolean variable indicating the state of the observed eye ("1"-blink, "0"-open) in time t, EOD(t) is eye openness data time series, and $\tau_{bunk}$ is blinking threshold and is an adjustable threshold parameter, for defining when blink occurs.

In an operation 806, blink information is generated based on the blink presence data. In some embodiments, blink information such as blink duration or blink frequency may be generated based on the blink presence data. For example, the blink duration and frequency may be generated by identifying the instances in the time series of blink presence data that indicated a presence of a blink. In some embodiments, the blink duration and blink frequency may be generated per sequence of the video stimulus. The blink duration and frequency may be determined as follows:

$$BD(T) = \max_{t \in T}\{t \mid EOD(t) \geq \tau_{blink}\} - \min_{t \in T}\{t \mid EOD(t) < \tau_{blink}\} \quad \text{Eq. (2)}$$

Where BD(T) is the blink duration within a time interval T, containing one full blink (e.g., eye open→eye closed→eye open). Note that a time segment T is freely bounded, and could include event, brick, sequence, or act, while t represents a specific timestamp.

The blink frequency may be determined as follows:

$$BF(T) = \int BLINK(t)dt \quad \text{Eq. (3)}$$

where BF(T) is the blink frequency in time interval T.

Figure 9:
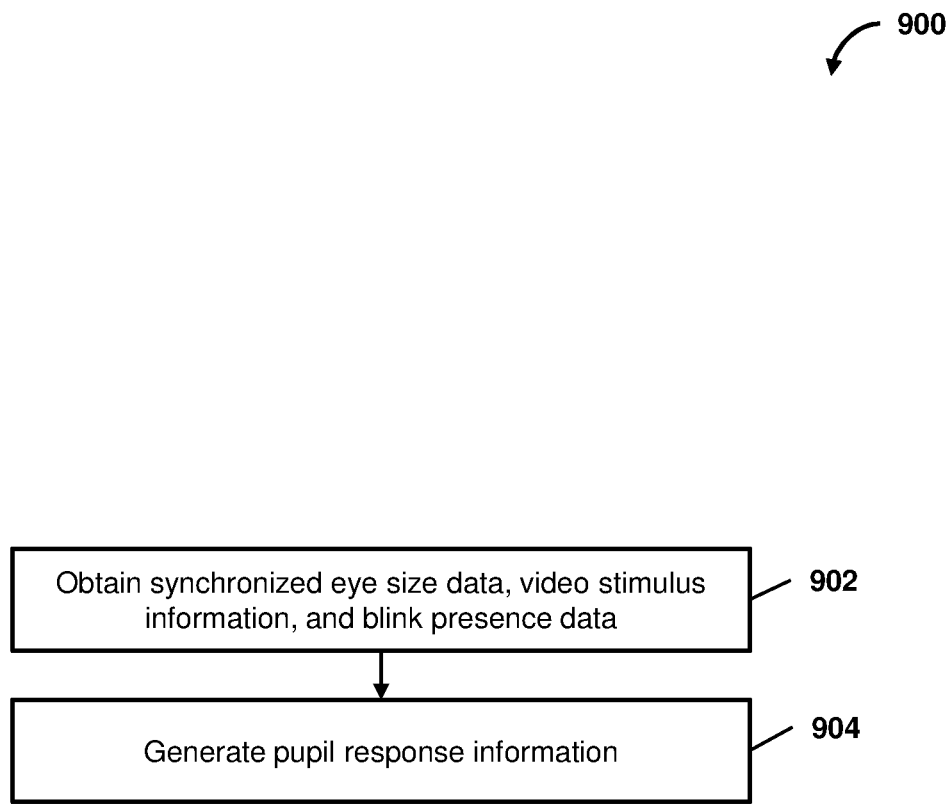
FIG. 9 is a flow diagram of a process for obtaining pupil response information, consistent with various embodiments.

FIG. 9 is a flow diagram of a process 900 for obtaining pupil response information, consistent with various embodiments. In some embodiments, the process 900 may be similar to the pupil response process 693 of the process 600 of FIG. 6. The process 900 may be implemented as part of operation 710 of process 700 of FIG. 7.

In an operation 902, eye size data, blink presence data and video stimulus information are obtained. For example, synchronized eye size data 612, the blink presence data of process 800, and the video stimulus information 620 are obtained. In some embodiments, the eye size data includes at least one of iris radius (e.g., iris radius 174) or pupil radius (e.g., pupil radius 178), which are indicative of the size of a pupil or iris. In some embodiments, the blink presence data may indicate a presence or absence of a blink at a particular instant. In some embodiments, the video stimulus information 620 may include information regarding a type of stimulus being presented on the display of the client device 106. In some embodiments, the eye size data and the blink presence data are obtained as time series data.

In an operation 904, pupil response information indicative of a response of the pupil to the video stimulus is generated based on the synchronized eye size data, video stimulus information, and blink presence data. For example, the pupil response information 645 may be obtained. In some embodiments, the pupil response information may include (a) pupil response amplitude that is indicative of a maximal variance of pupil diameter for an event, (b) pupil response rate that is indicative of mean temporal rate of variance in the pupil diameter for the event, (c) pupil response latency that is indicative of a time interval between an event in the video stimulus and an initial change in pupil diameter, and (d) pupil response duration that is indicative of a time interval between the initial change in the pupil diameter following the event and a stabilization of change in the size of the pupil diameter. In some embodiments, the pupil response information may be generated per event of the video stimulus and may be generated for each eye separately. The pupil response information may be generated using the synchronized eye size data, video stimulus information, and blink presence data in several ways (e.g., statistical analysis, time series analysis, signal processing, etc.). For example, the pupil response amplitude may be generated as follows:

$$PRA(T) = \max_{t \in T}\{PD(t)\} - \min_{t \in T}\{PD(t)\} \quad \text{Eq. (4)}$$

Where PRA(T) is the pupil response amplitude in a given time interval T, and PD(t) is the pupil diameter in a specific time t.

Pupil response rate may be determined as:

$$PRR(t) = \frac{d}{dt}PD(t) \quad \text{Eq. (5)}$$

Where PRR(t) is the pupil response rate in a specific time t.

Pupil response latency may be determined as:

$$PRL(T) = \min_{t \in T}\{t \mid PRR(t) > \tau_{pupil}\} - t_{stim} \quad \text{Eq. (6)}$$

Where PRL(T) is the pupil response latency in a given time interval T, $\tau_{pupil}$ is the threshold on pupil response rate for distinguishing a responding pupil from a static pupil, and $t_{stim}$ is the stimulus event time.

Pupil response duration may be determined as:

$$PRD(T) = \max_{t \in T}\{t \mid PRR(t) > \tau_{pupil}\} - \min_{t \in T}\{t \mid PRR(t) > \tau_{pupil}\} \quad \text{Eq. (7)}$$

Where PRD(T) is the pupil response duration given a time interval T.

Figure 10:
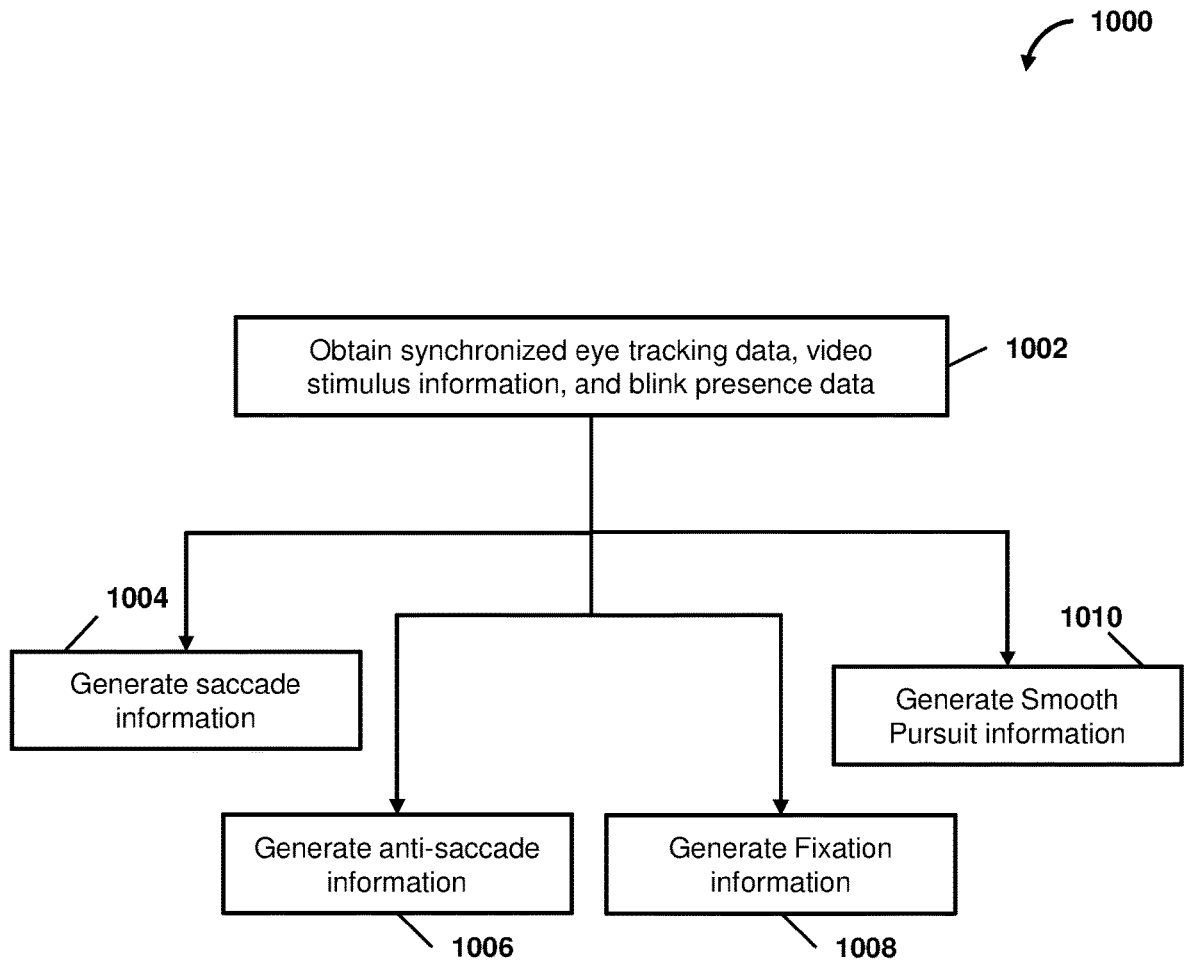
FIG. 10 is a flow diagram of a process for obtaining various eye movement parameters, consistent with various embodiments.

FIG. 10 is a flow diagram of a process 1000 for obtaining various eye movement parameters, consistent with various embodiments. In some embodiments, the process 1000 may be similar to the eye movement process 694 of the process 600 of FIG. 6. The process 1000 may be implemented as part of operation 710 of process 700 of FIG. 7. The below parameters may be generated for each eye separately.

In an operation 1002, eye tracking data, blink presence data and video stimulus information are obtained. For example, synchronized eye tracking data 617, the blink presence data of process 800, and the video stimulus information 620 are obtained. In some embodiments, the eye tracking data, which is indicative of a gaze or a location where the eye is focused at, includes at least one of pupil location (e.g., pupil center 176), iris translation (e.g., iris translation 172), or iris rotation (e.g., iris rotation 170). In some embodiments, the blink presence data may indicate a presence or absence of a blink at a particular instant. In some embodiments, the video stimulus information 620 may include information regarding a type of stimulus being presented on the display of the client device 106. In some embodiments, the eye tracking data and the blink presence data are obtained as time series data. The eye tracking data, blink presence data and video stimulus information may be used as input data for generating various eye movement parameters.

In an operation 1004, saccade information, which may be indicative of rapid movement of the eye in response to the video stimulus, is obtained. For example, saccade information 650 is obtained. The saccade information may represent distribution of eye movements between inspection areas in the video stimulus. The saccade information may include at least one of saccade latency, saccade amplitude, saccade peak velocity, saccade overshoot amplitude, or saccade correction time. In some embodiments, saccade information may be generated per event of the video stimulus. The saccade information may be obtained using the input data in several ways (e.g., statistical analysis, time series analysis, signal processing, etc.). For example, saccade information may be obtained as follows: Saccadic parameters are based on the measurement of the eye tracking data or gaze location time series x(t). The event of saccade may be defined by an adjustable threshold $\tau_{saccade}$ on the eye velocity $$v(t) = \frac{d}{dt}x(t).$$

In a time segment T, multiple saccade event may occur, when their start and end time may be determined by the following equations:

$$t^0_{start} = \min_{t \in T}\{t \mid v(t) > \tau_{saccade}\} \quad \text{Eq. (8)}$$

$$t^0_{end} = \min_{t \in T}\left\{t \,\middle|\, \begin{array}{c} v(t) > \tau_{saccade} \\ t > t^0_{start} \end{array}\right\}$$

$$t^{n+1}_{start} = \min_{t \in T}\left\{t \,\middle|\, \begin{array}{c} v(t) > \tau_{saccade} \\ t > t^n_{end} \end{array}\right\}$$

$$t^{n+1}_{end} = \min_{t \in T}\left\{t \,\middle|\, \begin{array}{c} v(t) > \tau_{saccade} \\ t > t^{n+1}_{start} \end{array}\right\}$$

a. Saccade Latency (SL):

$$SL = t_{start}^0 - t_{stim} \quad \text{Eq. (9)}$$

Where SL is the saccade latency time, representing the duration between the stimulus event time $t_{stim}$, and the start time of the saccadic movement $t_{start}^0$.

b. Saccade Amplitude (SA):

$$SA(T) = \max_{t \in T}\{x(t)\} - \min_{t \in T}\{x(t)\} \quad \text{Eq. (10)}$$

Where SA(T) is the saccade amplitude for a given time interval T, and x(t) is the gaze location coordinates in a specific time t.

c. Saccade Peak Velocity (SPV):

$$SPV(T) = \max_{t \in T}\{v(t)\} \quad \text{Eq. (11)}$$

Where SPV(T) is the saccade peak velocity in a given time interval T, and v(t) is the gaze location velocity in a specific time t.

d. Saccade Overshoot Amplitude (SOA):

$$SOA(T) = x(t_{end}^0) - x_{target} \quad \text{Eq. (12)}$$

Where SOA(T) is the saccade overshoot amplitude in a given time interval T, $x(t_{end}^0)$ is the gaze location at the detected end time of the first retrieved saccade movement, and $x_{target}$ is the location of the stimulus target on the display.

e. Saccade Correction Time (SCT):

$$SCT(T) = \min_{t \in t_{end}}\{t \mid abs(x(t) - x_{target}) \le \delta\} \quad \text{Eq. (13)}$$

Where SCT(T) is the saccade correction time in a given time interval T, x(t) is the gaze location in a specific time t, $x_{target}$ is the location of the stimulus target, and $\delta$ is the allowed error of the gaze from the target.

In an operation 1006, anti-saccade information, which may be indicative of a movement of the eye in a direction opposite to a side where a target is presented in the video stimulus, is obtained. For example, anti-saccade information 655 is obtained. The anti-saccade information may include at least one of anti-saccade latency, anti-saccade amplitude, anti-saccade peak velocity, anti-saccade overshoot amplitude, anti-saccade correction time, anti-saccade direction confusion rate and anticipated anti-saccadic movement. In some embodiments, the anti-saccade information may be generated per event of the video stimulus. The anti-saccade information may be generated using the input data in several ways (e.g., statistical analysis, time series analysis, signal processing, etc.). For example, anti-saccade information may be determined as follows:

a. Anti-Saccade Latency (ASL):

$$ASL = t_{start}^0 - t_{stim} \quad \text{Eq. (14)}$$

Where ASL is the anti-saccade latency time, representing the duration between the stimulus event time $t_{stim}$, and the start time of the anti-saccadic movement $t_{start}^0$.

b. Anti-Saccade Amplitude (ASA):

$$ASA(T) = \max_{t \in T}\{x(t)\} - \min_{t \in T}\{x(t)\} \quad \text{Eq. (15)}$$

Where ASA(T) is the anti-saccade amplitude for a given time interval T, and x(t) is the gaze location coordinates in a specific time t.

c. Anti-Saccade Peak Velocity (ASPV):

$$ASPV(T) = \max_{t \in T}\{abs(v(t))\} \qquad \text{Eq. (16)}$$

Where ASPV(T) is the anti-saccade peak velocity in a given time interval T, and v(t) is the gaze location velocity in a specific time t.

d. Anti-Saccade Overshoot Amplitude (ASOA):

$$ASOV(T) = x(t_{end}^0) - x_{target} \qquad \text{Eq. (17)}$$

Where ASOA(T) is the anti-saccade overshoot amplitude in a given time interval T, $x(t_{end}^0)$ is the gaze location at the detected end time of the first retrieved anti-saccade movement, and $x_{target}$ is the location of the stimulus target on the display.

e. Anti-Saccade Correction Time (ASCT):

$$ASCT(T) = \min_{t \in t_{end}}\{t \mid abs(x(t) - x_{target}) \le \delta\} \qquad \text{Eq. (18)}$$

Where ASCT(T) is the anti-saccade correction time in a given time interval T, $x_{target}$ is the location of the stimulus target, and $\delta$ is the allowed error of the gaze from the target.

f. Anti-Saccade Direction Confusion Rate (ASCR):
When more than 2 anti-saccadic stimuli are included in the sequence—the fraction of saccadic movements that are directionally reversed to the anti-saccadic target.

g. Anticipated Anti-Saccadic (AAS):

$$AAS = \begin{cases} 1, & ASL \le 0,\ v(t = t_{start}^0) > 0 \\ 0, & ASL > 0 \end{cases} \qquad \text{Eq. (19)}$$

Where AAS is a Boolean variable indicating the event of an anticipated anti-saccade, ASL is the anti-saccade latency time, and $v(t=t_{start}^0)$ is the gaze movement velocity at the start time of the first anti-saccadic movement.

In an operation 1008, fixation information, which may be indicative of an ability of the eye to maintain a gaze on a single location in the video stimulus, obtained. For example, fixation information 670 is obtained. The fixation may be defined as the distribution of eye movements while inspecting a specific area of the stimulus. The fixation information may include at least one of micro-saccade amplitude distribution, SWJ amplitude, SWJ frequency, or SWJ offset duration. The fixation information may be generated using the input data in several ways (e.g., statistical analysis, time series analysis, signal processing, etc.). In some embodiments, the fixation information may be generated per brick of the video stimulus.

In an operation 1010, smooth pursuit information, which may be indicative of a type of eye movement (e.g., smooth, and gradual movement as opposed to rapid movement in saccade) in which the eyes remain fixated on a moving object in the video stimulus, is obtained. For example, smooth pursuit information 675 is obtained. Smooth pursuit may be defined as the distribution of eye movements while following movement (e.g., of a target in the video stimulus). The smooth pursuit information may include at least one of (a) a classification of the eye movement type, (b) saccadic movement amplitude percentage, (c) smooth movement amplitude percentage, (d) saccadic movement temporal percentage, (e) fixation temporal percentage, or (f) smooth movement temporal percentage. The movement type classification may include classification of the eye movements in an entire act of the video stimulus into saccadic movement, smooth movement, and fixation movement types. In some embodiments, the classification of the eye movement type is generated per event of the video stimulus and the remaining fixation information may be generated per brick of the video stimulus. The smooth pursuit information may be generated using the input data in several ways (e.g., statistical analysis, time series analysis, signal processing, etc.). For example, classification of the eye movement type (EMT) may be determined as follows: The basic classification is based on thresholds regarding the eye movement velocity v(t), where $\tau_{fix}$ is the upper velocity threshold for fixation state, and $\tau_{saccade}$ is the upper threshold for smooth movement (and the lower threshold for a saccadic movement).

$$EMT = \begin{cases} Fixation, & 0 \le v(t) < \tau_{fix} \\ Smooth, & \tau_{fix} \le v(t) < \tau_{saccadic} \\ Saccadic, & \tau_{saccadic} \le v(t) \end{cases} \qquad \text{Eq. (20)}$$

Figure 11:
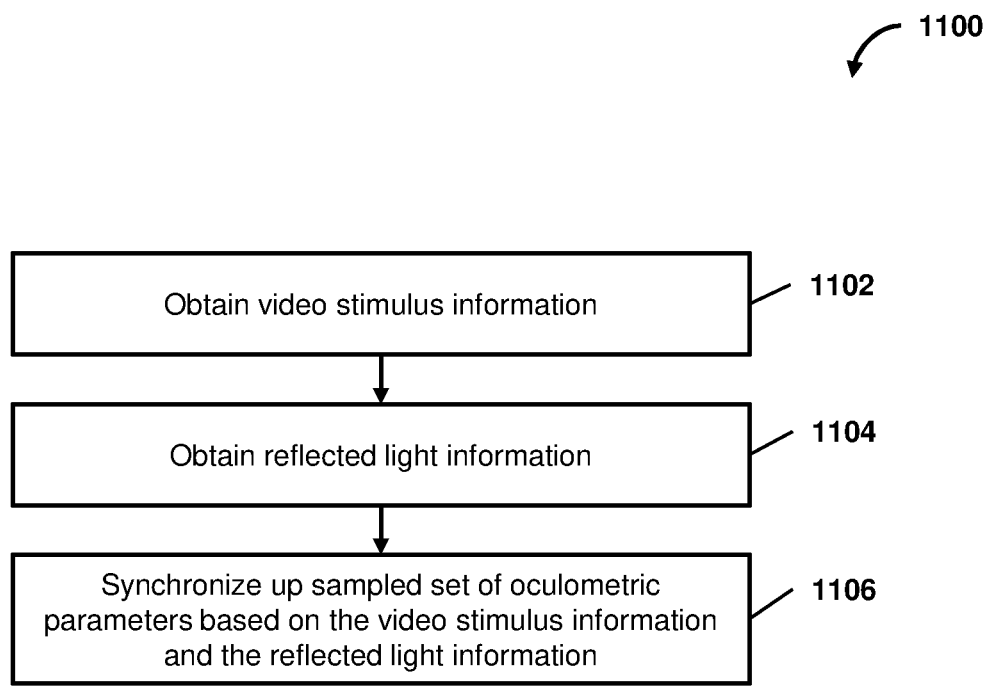
FIG. 11 is a flow diagram of a process for synchronizing oculometric parameters, consistent with various embodiments.

FIG. 11 is a flow diagram of a process 1100 for synchronizing oculometric parameters, consistent with various embodiments. In some embodiments, the process 1100 may be similar to the synchronization process 691 of the process 600 of FIG. 6. The process 1100 may be implemented as part of operation 708 of process 700 of FIG. 7.

In an operation 1102, video stimulus information is obtained. For example, video stimulus information 620 may be obtained. In some embodiments, the video stimulus information may include stimulus brightness and color modulation pattern (e.g., a two-dimensional array), which may be used as a synchronization signal for synchronizing the oculometric parameters. The video stimulus information may also include information that is descriptive of the graphical features of the video stimulus (e.g., background of video stimulus, brightness, contrast, or color component values), or information regarding a stimulus type (e.g., which is designated for a specific feature such as saccade, fixation, or smooth pursuit) that is presented on the display of the client device 106. In some embodiments, the synchronization signal is determined based on the graphical features of the video stimulus and the stimulus type.

In an operation 1104, reflected light information, which may be indicative of mean reflected light from a target in the environment in which the user is located, may be obtained. For example, reflected light information 625 may be obtained. The reflected light may include light reflected from a face of the user or from any object in the environment of the user (e.g., a room in which the user is located). The mean reflected light may be measured by processing the video stream captured using the camera 120 and may be measured as two-dimensional array of RGB intensity values.

In an operation 1106, the set of oculometric parameters (e.g., the eye openness data 605, eye size data 610 and eye tracking data 615, or the up sampled eye openness data 606, up sampled eye size data 611 and up sampled eye tracking data 616) may be synchronized based on the video stimulus information and the reflected light information. In some embodiments, synchronizing the set of oculometric parameters synchronizes the time series of the oculometric parameters. For example, consider that an event, such as a dot starts moving from a specific location in the video stimulus at a time t in the video stimulus, but the oculometric parameters corresponding to the eye movement (e.g., eye tracking data 615 or up sampled eye tracking data 616) measured using video stream captured from the camera 120 of the client device 106 is recorded at t+x milliseconds, then there is a lag of x milliseconds, which may cause inaccuracy in determining the eye movement parameters. By synchronizing the oculometric parameters with the video stimulus, the time component of the oculometric parameters is shifted by x milliseconds (e.g., t−x) to compensate the lag of x milliseconds. Accordingly, in some embodiments, synchronizing the oculometric parameters with the video stimulus may result in an improved accuracy in determining the eye movement parameters.

In some embodiments, the various computers and subsystems illustrated in FIG. 1A may include one or more computing devices that are programmed to perform the functions described herein. The computing devices may include one or more electronic storages (e.g., prediction database(s) 132, which may include training data database(s) 134 to store training data, model database(s) 136 to store prediction models, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Figure 12:
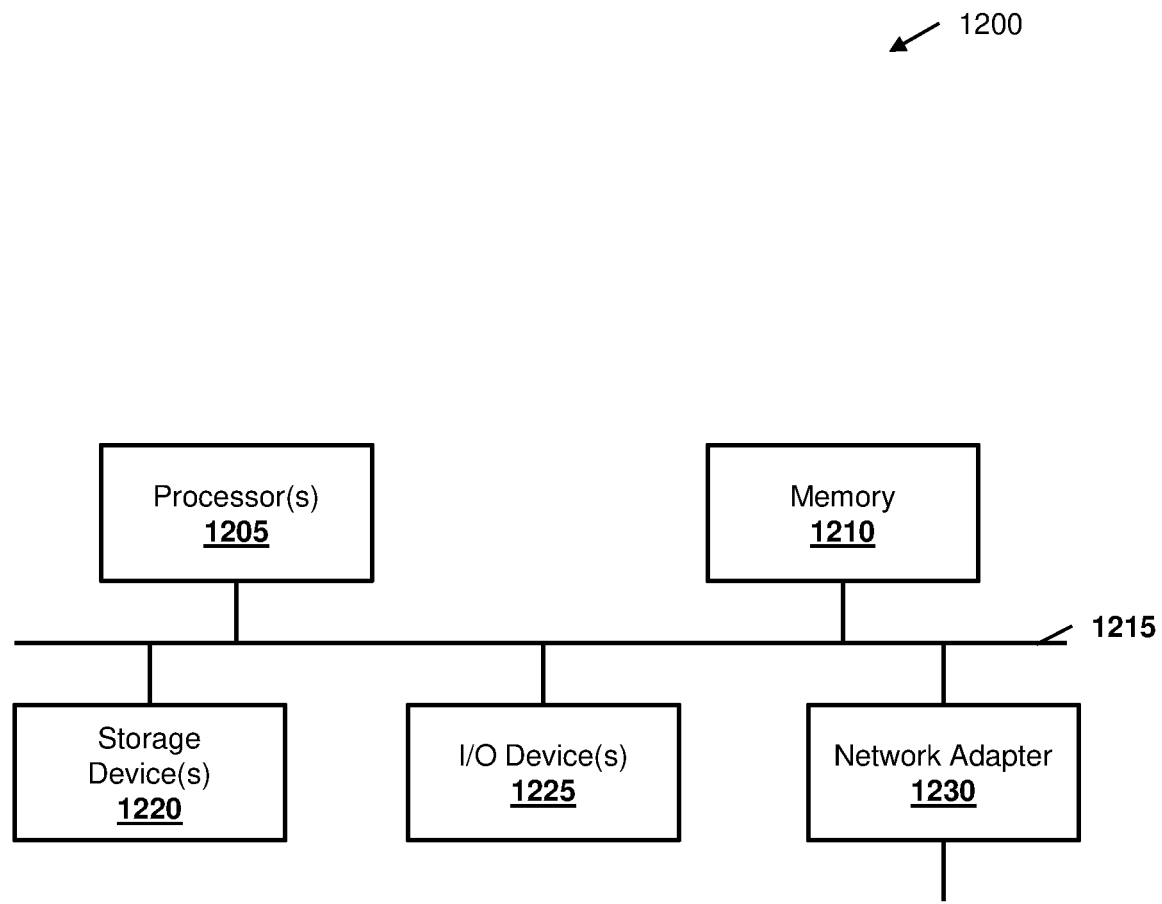
FIG. 12 is a block diagram of a computer system as may be used to implement features of the disclosed embodiments.

FIG. 12 is a block diagram of a computer system as may be used to implement features of the disclosed embodiments. The computer system 1200 may be used to implement any of the entities, subsystems, components or services depicted in the examples of the foregoing figures (and any other components described in this specification). The computer system 1200 may include one or more central processing units ("processors") 1205, memory 1210, input/output devices 1225 (e.g., keyboard and pointing devices, display devices), storage devices 1220 (e.g., disk drives), and network adapters 1230 (e.g., network interfaces) that are connected to an interconnect 1215. The interconnect 1215 is illustrated as an abstraction that represents any one or more separate physical buses, point to point connections, or both connected by appropriate bridges, adapters, or controllers. The interconnect 1215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 1210 and storage devices 1220 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The instructions stored in memory 1210 can be implemented as software and/or firmware to program the processor(s) 1205 to carry out actions described above. The processors may be programmed to execute computer program instructions by software; hardware; firmware; some combination of software, hardware, or firmware; and/or other mechanisms for configuring processing capabilities on the processors. In some embodiments, such software or firmware may be initially provided to the computer system 1200 by downloading it from a remote system through the computer system 1200 (e.g., via network adapter 1230).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A method comprising:

obtaining a video stream from a client device associated with a user, the video stream including a video of a face of the user;

processing the video stream to obtain a set of oculometric parameters, wherein the set of oculometric parameters includes (a) eye tracking data that is indicative of a rotation of an iris associated with an eye of the user, and a location of a pupil and the iris, (b) eye size data indicative of a pupil radius and iris radius, and (c) eye openness data that is indicative of an openness of the eye, wherein the set of oculometric parameters is time series data;

synchronizing the set of oculometric parameters with a video stimulus presented on a display of the client device to obtain a synchronized set of oculometric parameters, wherein the synchronization is based on light modulation in the video stimulus, wherein the synchronizing comprises:

obtaining video stimulus information, wherein the video stimulus information includes stimulus type information, information descriptive of graphic features of the video stimulus, or brightness and color modulation information of the video stimulus;

obtaining reflected light information, wherein the reflected light information includes information regarding light reflected from a target in an environment in which the user is located, and red, green, and blue (RGB) intensity values sampled from the video stream received from the client device; and synchronizing a time component in the set of the oculometric parameters time series data based on the video stimulus information and the reflected light information to generate the synchronized set of oculometric parameters;

obtaining, based on the synchronized set of oculometric parameters, a set of eye movement parameters that are indicative of a movement of the eye in response to the video stimulus; and determining one or more digital markers of the user based on the set of eye movement parameters.

2. The method of claim 1, wherein the eye openness data includes iris visible fraction information, iris coverage asymmetry information, pupil visible fraction information, and pupil coverage asymmetry information.

3. The method of claim 1, wherein obtaining the set of eye movement parameters includes:

obtaining, based on the eye openness data, blink information that is indicative of blinking of the eye.

4. The method of claim 3, wherein obtaining the blink information includes:

obtaining, based on a time series of the eye openness data, a time series of blink presence data that is indicative of a presence or absence of a blink at a given instant; and obtaining the blink information based on the time series of the blink presence data.

5. The method of claim 3, wherein the blink information includes (a) blink duration information that is indicative of a duration of blinking of the eye for a sequence of the video stimulus, and (b) blink frequency information that is indicative of a frequency of blink for the sequence.

6. The method of claim 1, wherein the eye size data includes iris radius and pupil radius.

7. The method of claim 1, wherein obtaining the set of eye movement parameters includes:

obtaining pupil response information based on the eye size data, blink presence data and a stimulus type of the video stimulus, wherein the pupil response information is indicative of a response of the pupil or the eye to the video stimulus.

8. The method of claim 7, wherein the pupil response information includes (a) pupil response amplitude that is indicative of a maximal variance of pupil diameter for an event, and (b) pupil response rate that is indicative of mean temporal rate of variance in the pupil diameter for the event.

9. The method of claim 7, wherein the pupil response information includes (a) pupil response latency that is indicative of a time interval between an event in the video stimulus and an initial change in pupil diameter, and (b) pupil response duration that is indicative of a time interval between the initial change in the pupil diameter following the event and a stabilization of change in the size of the pupil diameter.

10. The method of claim 1, wherein the eye tracking data includes iris translation and pupil location.

11. The method of claim 1, wherein obtaining the set of eye movement parameters includes:

obtaining saccade information based on the eye tracking data, blink presence data and a stimulus type of the video stimulus, wherein the saccade information is indicative of a rapid movement of the eye in response to the video stimulus.

12. The method of claim 11, wherein the saccade information includes at least one of (a) saccade latency, (b) saccade amplitude, (c) saccade peak velocity, (d) saccade overshoot amplitude, or (e) saccade correction time.

13. The method of claim 1, wherein obtaining the set of eye movement parameters includes:

obtaining anti-saccade information based on the eye tracking data, blink presence data and a stimulus type of the video stimulus, wherein the anti-saccade information is indicative of a movement of the eye in a direction opposite to a side where a target is presented in the video stimulus.

14. The method of claim 13, wherein the anti-saccade information includes at least one of anti-saccade latency, anti-saccade amplitude, anti-saccade peak velocity, anti-saccade overshoot amplitude, anti-saccade correction time, anti-saccade direction confusion rate, or anticipated anti-saccadic information.

15. The method of claim 1, wherein obtaining the set of eye movement parameters includes:

obtaining fixation information based on the eye tracking data, blink presence data and a stimulus type of the video stimulus, wherein the fixation information is indicative of an ability of the eye to maintain a gaze on a single location in the video stimulus.

16. The method of claim 15, wherein the fixation information includes micro-saccade amplitude distribution that is indicative of a distribution of both angular and amplitude around a target in the video stimulus.

17. The method of claim 15, wherein obtaining the fixation information includes obtaining square wave jerk information.

18. The method of claim 17, wherein the square wave jerk information includes at least one of square wave jerk amplitude, square wave jerk frequency, or square wave jerk offset duration.

19. The method of claim 1, wherein obtaining the set of eye movement parameters includes:

obtaining smooth pursuit information based on the eye tracking data, blink presence data and a stimulus type of the video stimulus, wherein the smooth pursuit information is indicative of a type of eye movement in which the eyes remain fixated on a moving object in the video stimulus.

20. The method of claim 19, wherein obtaining smooth pursuit information includes:

determining a movement of the eye as one of saccade, fixation, or smooth pursuit.

21. The method of claim 19, wherein obtaining the smooth pursuit information includes:

obtaining at least one of saccadic movement amplitude percentage, or smooth movement amplitude percentage.

22. The method of claim 19, wherein obtaining the smooth pursuit information includes:

obtaining saccadic movement temporal percentage that is indicative of a time fraction of saccadic movements for an act in the video stimulus.

23. The method of claim 19, wherein obtaining the smooth pursuit information includes:

obtaining fixation temporal percentage that is indicative of a time fraction of fixation for an act in the video stimulus.

24. The method of claim 19, wherein obtaining the smooth pursuit information includes:

obtaining smooth movement temporal percentage that is indicative of a time fraction of smooth movements for an act in the video stimulus.

25. The method of claim 1, wherein the set of eye movement parameters is measured for at least one of an event, a brick, a sequence, or an act.

26. The method of claim 25, wherein the event corresponds to an event of a specified duration in the video stimulus, wherein the brick corresponds to a collection of consecutive events in the video stimulus, wherein the sequence corresponds to a collection of consecutive bricks of the same type of brick, and wherein the act corresponds to a collection of consecutive sequences recorded for the user.

27. The method of claim 1, wherein processing the video stream includes:
obtaining the set of oculometric parameters at a first temporal resolution; and
up sampling the set of oculometric parameters to obtain the set of oculometric parameters at a second temporal resolution greater than the first temporal resolution.

28. The method of claim 27, wherein up sampling the set of oculometric parameters includes:
up sampling the set of oculometric parameters prior to synchronizing the set of oculometric parameters.

29. The method of claim 27, wherein up sampling the set of oculometric parameters includes:
obtaining a first plurality of sets of oculometric parameters at the first temporal resolution;
obtaining, using an eye tracking device configured to generate oculometric parameters at the second temporal resolution, the first plurality of sets of oculometric parameters at the second temporal resolution; and
training a machine learning model with the first plurality of sets of oculometric parameters to generate a predicted set of oculometric parameters at the second temporal resolution.

30. The method of claim 1 further comprising:
generating a set of digital biomarkers based on the set of eye movement parameters.

31. A non-transitory computer-readable medium having instructions that, when executed by a computer, cause the computer to execute a method, the method comprising:
obtaining a video stream from a client device associated with a user, the video stream including a video of a face of the user;
obtaining a time series of a set of oculometric parameters from the video stream, wherein the set of oculometric parameters includes (a) eye tracking data that is indicative of a rotation of an iris associated with an eye of the user, and a location of a pupil and the iris, (b) eye size data indicative of a pupil radius and iris radius, and (c) eye openness data that is indicative of an openness of the eye, wherein the set of oculometric parameters is obtained at a first temporal resolution;
up sampling the set of oculometric parameters to a second temporal resolution to generate an up sampled set of oculometric parameters, wherein the second temporal resolution is greater than the first temporal resolution;
synchronizing the up sampled set of oculometric parameters with a video stimulus presented on a display of the client device to obtain a synchronized set of oculometric parameters, wherein the synchronizing is based on light modulation in the video stimulus, wherein the synchronizing comprises:
obtaining video stimulus information, wherein the video stimulus information includes stimulus type information, information descriptive of graphic features of the video stimulus, or brightness and color modulation information of the video stimulus;
obtaining reflected light information, wherein the reflected light information includes information regarding light reflected from a target in an environment in which the user is located, and red, green, and blue (RGB) intensity values sampled from the video stream received from the client device; and
synchronizing a time component in the set of the up sampled set of oculometric parameters based on the video stimulus information and the reflected light information to generate the synchronized set of oculometric parameters; and
obtaining, based on the synchronized set of oculometric parameters, a set of eye movement parameters that are indicative of a movement of the eye in response to the video stimulus.

32. The computer-readable medium of claim 31, wherein obtaining the set of eye movement parameters includes:
obtaining, based on the eye openness data, blink information that is indicative of blinking of the eye;
obtaining pupillary response information based on the eye size data, the blink information, and a stimulus type of the video stimulus, wherein the pupillary response information is indicative of a response of the pupil to the video stimulus; and
obtaining at least one of saccade information, anti-saccade information, fixation information, or smooth pursuit information based on the eye tracking data, the blink information, and the stimulus type.

33. A system, comprising:
a memory storing a set of instructions; and
a processor configured to execute the set of instructions to cause the system to perform a method of:
obtaining a video stream from a client device associated with a user, the video stream including a video of a face of the user;
processing the video stream to obtain a set of oculometric parameters, wherein the set of oculometric parameters includes (a) eye tracking data that is indicative of a rotation of an iris associated with an eye of the user, and a location of a pupil and the iris, (b) eye size data indicative of a pupil radius and iris radius, and (c) eye openness data that is indicative of an openness of the eye;
synchronizing the set of oculometric parameters with a video stimulus presented on a display of the client device to obtain a synchronized set of oculometric parameters, wherein the synchronizing is based on light modulation in the video stimulus, wherein the synchronizing comprises:
obtaining video stimulus information, wherein the video stimulus information includes stimulus type information, information descriptive of graphic features of the video stimulus, or brightness and color modulation information of the video stimulus;
obtaining reflected light information, wherein the reflected light information includes information regarding light reflected from a target in an environment in which the user is located, and red, green, and blue (RGB) intensity values sampled from the video stream received from the client device; and
synchronizing a time component in the set of the up sampled set of oculometric parameters based on the video stimulus information and the reflected light information to generate the synchronized set of oculometric parameters; and
obtaining, based on the synchronized set of oculometric parameters, a set of eye movement parameters that are indicative of a movement of the eye in response to the video stimulus.

* * * * *